United States Patent
Foltz et al.

(10) Patent No.: US 6,446,826 B1
(45) Date of Patent: Sep. 10, 2002

(54) SEAL FOR FILLER NECK CLOSURE ASSEMBLY

(75) Inventors: Dean C. Foltz, Shelbyville; Robert S. Harris, Connersville; William Abney, III, Richmond, all of IN (US)

(73) Assignee: Stant Manufacturing Inc., Connersville, IN (US)

( * ) Notice: Subject to any disclaimer, the term of this patent is extended or adjusted under 35 U.S.C. 154(b) by 0 days.

(21) Appl. No.: 09/367,334

(22) PCT Filed: Feb. 11, 1998

(86) PCT No.: PCT/US98/02876
§ 371 (c)(1),
(2), (4) Date: Aug. 11, 1999

(87) PCT Pub. No.: WO98/34833
PCT Pub. Date: Aug. 13, 1998

Related U.S. Application Data

(60) Provisional application No. 60/040,247, filed on Feb. 11, 1997, and provisional application No. 60/056,286, filed on Sep. 3, 1997.

(51) Int. Cl.⁷ .......................... B65D 47/00; B65D 51/16
(52) U.S. Cl. .............................. 220/86.2; 220/203.01; 220/203.28; 220/746; 220/DIG. 33
(58) Field of Search .............................. 220/562, 86.2, 220/582, 254, 255, 256, 259, 810, DIG. 33, 564, 581, 202, 203.1, 203.3, 203.4, 203.8, 203.9, 203.11, 203.12, 203.19, 203.2, 203.24, 203.27, 203.28, 203.29, 265, 266, 378, 86.1, 746; 141/312, 348, 349, 350; 296/97.22; 280/834

(56) References Cited

U.S. PATENT DOCUMENTS

| | | |
|---|---|---|
| 3,820,680 A | 6/1974 | Friend |
| 3,831,801 A | 8/1974 | Rodgers |
| 4,000,633 A | 1/1977 | Evans |
| 4,142,756 A | 3/1979 | Henning et al. |
| 4,177,931 A | 12/1979 | Evans |
| 4,280,346 A | 7/1981 | Evans |
| 4,294,375 A | 10/1981 | Gerdes |
| 4,312,649 A | 1/1982 | Fujii et al. |
| 4,424,839 A | 1/1984 | Otani et al. |
| 4,498,493 A | 2/1985 | Harris |
| 4,651,889 A | 3/1987 | Uranishi et al. |
| 4,676,390 A | 6/1987 | Harris |
| 4,678,097 A | 7/1987 | Crute |
| 4,702,386 A | 10/1987 | Boehmer et al. |
| 4,714,172 A | 12/1987 | Morris |
| 4,726,488 A | 2/1988 | Kasugai |

(List continued on next page.)

FOREIGN PATENT DOCUMENTS

| | | |
|---|---|---|
| DE | 42 18 287 A1 | 12/1993 |
| DE | 42 43 883 A1 | 6/1994 |
| EP | 0 265 829 A1 | 5/1988 |

*Primary Examiner*—Lee Young
*Assistant Examiner*—Niki M. Eloshway
(74) *Attorney, Agent, or Firm*—Barnes & Thornburg

(57) ABSTRACT

A filler neck closure assembly (20) includes a housing (74) formed to include a passage (77), a tank pressure control assembly (84) in passage (77), and an outer shell (44) coupled to housing (74). Closure assembly (20) includes a sleeve (185) that reinforces housing (74) and shields tank pressure control assembly (84). Closure assembly (20) also includes a sealing gasket (192) and a foam ring (210) between housing (74) and a side wall (46) of outer shell (44) leakage of fuel vapor therebetween. Outer shell (44) includes frangible tabs (260) that break away from the rest of outer shell (44) in a controlled manner when outer shell (44) is subjected to an impact during a vehicle crash. Outer shell (44) is formed to include a fluid drain (421) and closure assembly (20) includes a float (425) that closes fluid drain (421) and that moves to open fluid drain (421) to allow accumulated fluid to drain out of outer shell (44).

73 Claims, 14 Drawing Sheets

U.S. PATENT DOCUMENTS

| | | |
|---|---|---|
| 4,741,369 A | 5/1988 | Dawson |
| 4,747,508 A | 5/1988 | Sherwood |
| 4,762,247 A | 8/1988 | Temmesfeld |
| 4,765,504 A | 8/1988 | Sherwood et al. |
| 4,765,505 A | 8/1988 | Harris |
| 4,816,045 A | 3/1989 | Szlaga et al. |
| 4,877,146 A | 10/1989 | Harris |
| 4,881,578 A | 11/1989 | Rich et al. |
| 4,883,103 A | 11/1989 | Szlaga et al. |
| 4,946,060 A | 8/1990 | Sherwood et al. |
| 4,966,299 A | 10/1990 | Teets et al. |
| 4,977,936 A * | 12/1990 | Thompson et al. ......... 141/312 |
| 4,986,439 A | 1/1991 | Ott et al. |
| 5,027,868 A | 7/1991 | Morris et al. |
| 5,056,570 A | 10/1991 | Harris et al. |
| 5,110,003 A | 5/1992 | MacWilliams |
| 5,195,566 A | 3/1993 | Ott et al. |
| 5,203,466 A | 4/1993 | Kasugai et al. |
| 5,238,034 A | 8/1993 | Corfitsen |
| 5,271,438 A | 12/1993 | Griffin et al. |
| 5,322,100 A | 6/1994 | Buechler et al. |
| 5,439,129 A * | 8/1995 | Buechler ................... 220/86.2 |
| 5,449,086 A | 9/1995 | Harris |
| 5,509,569 A | 4/1996 | Hiranuma et al. |

\* cited by examiner

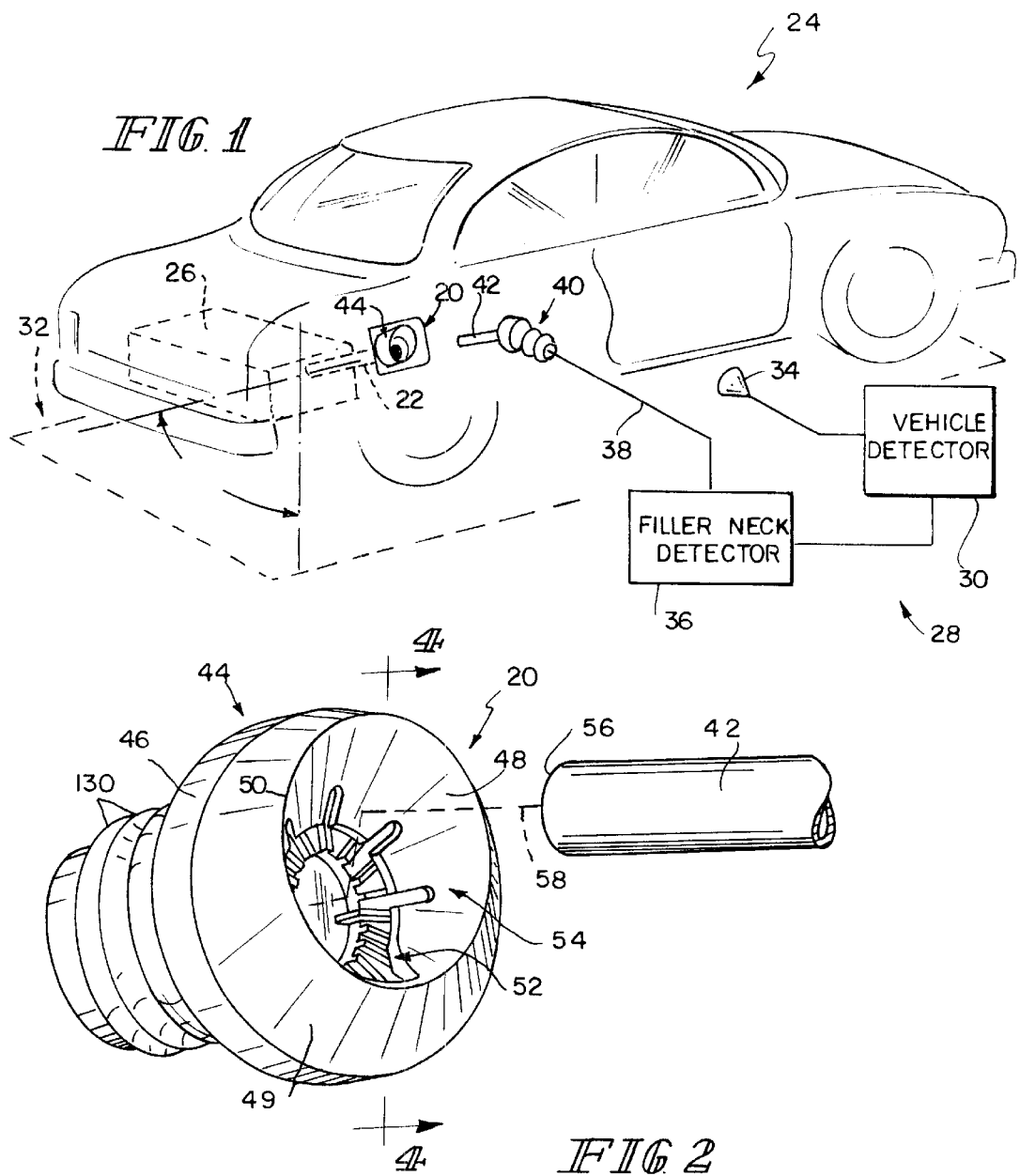

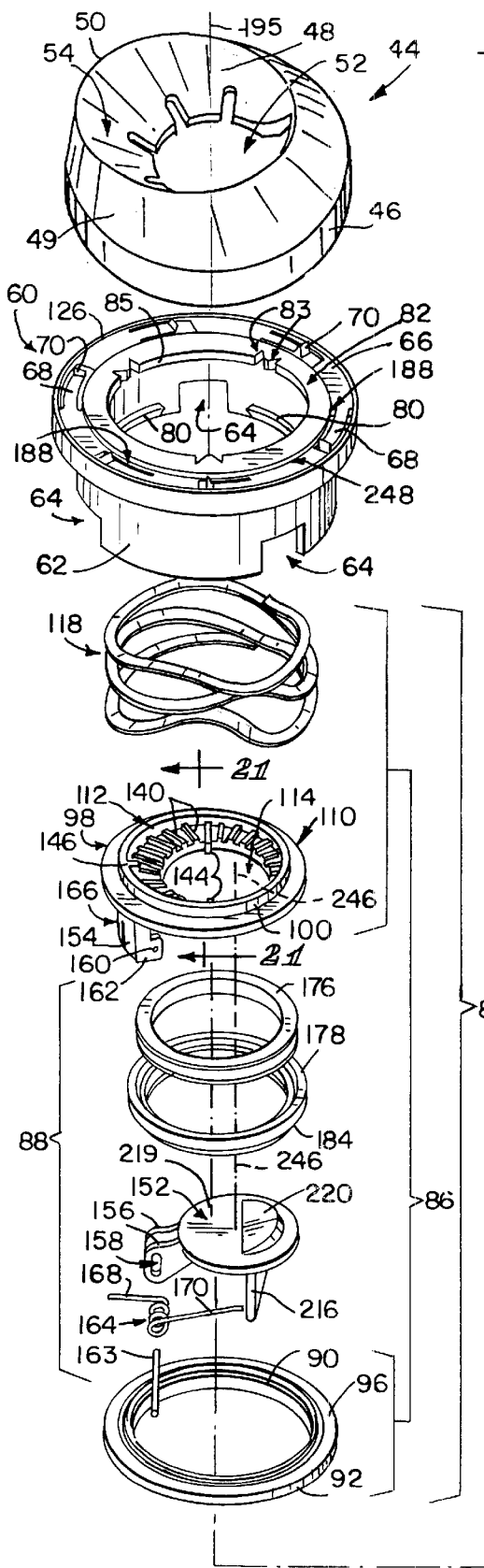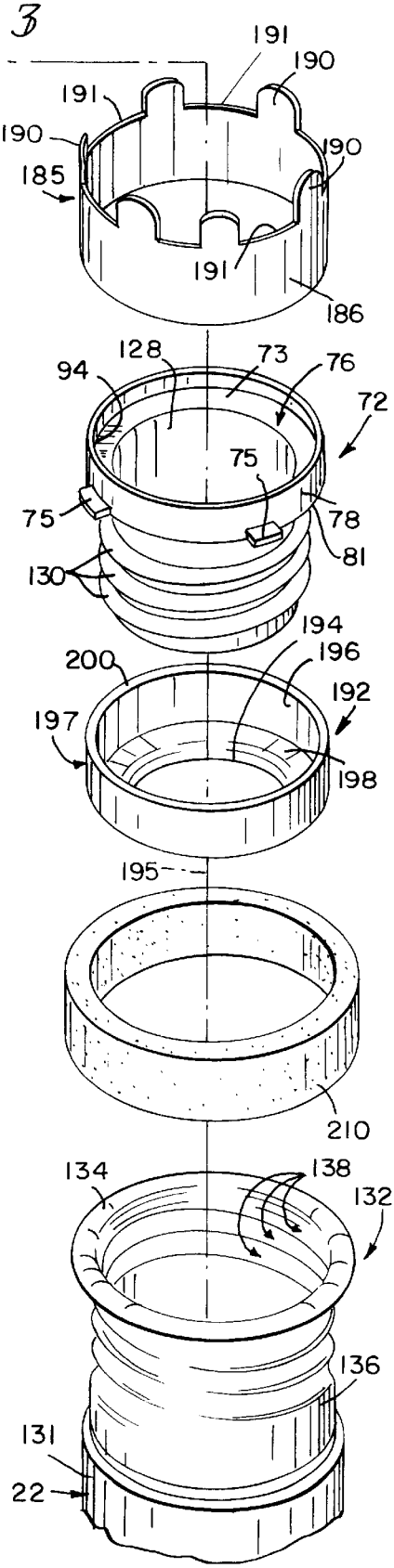

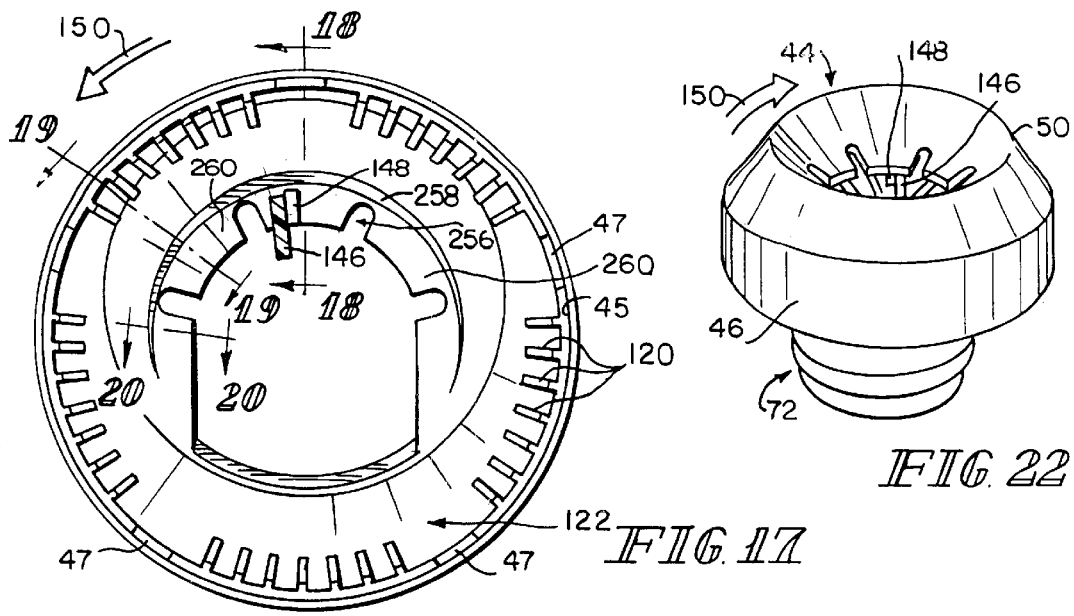
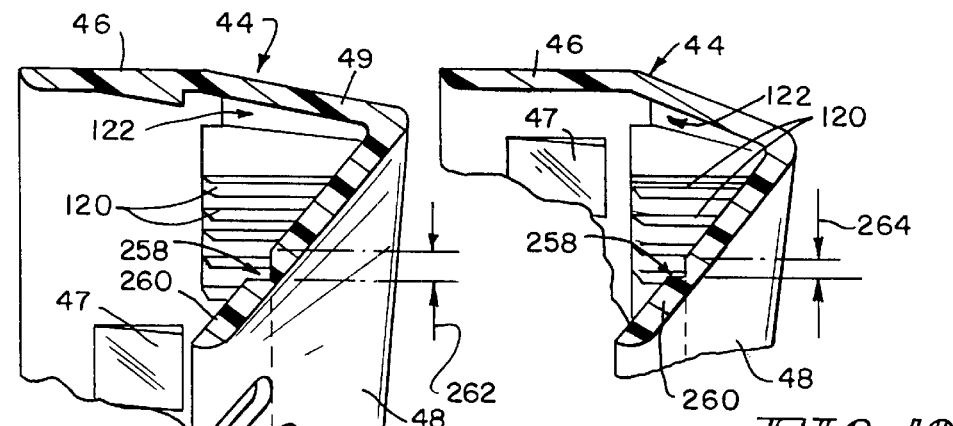
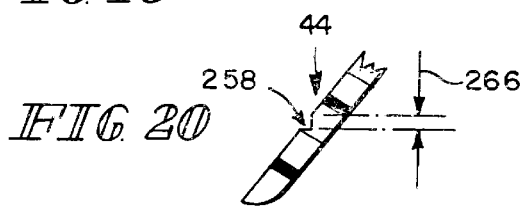
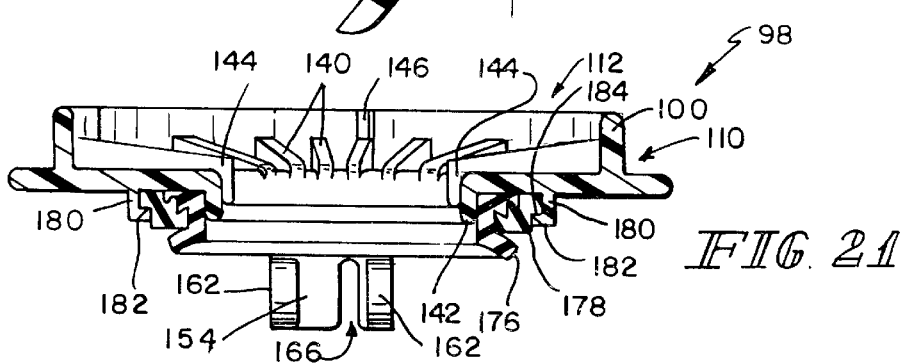

US 6,446,826 B1

SEAL FOR FILLER NECK CLOSURE ASSEMBLY

CROSS-REFERENCES TO RELATED APPLICATIONS

This application is a U.S. national application of international application serial No. PCT/US98/02876 filed Feb. 11, 1998, which claims priority to U.S. provisional applications Serial Nos. 60/040,247 and 60/056,286 filed Feb. 11, 1997 and Sep. 3, 1997, respectively.

BACKGROUND AND SUMMARY OF THE INVENTION

The present invention relates to a filler neck closure assembly for a vehicle tank, and particularly, to a capless filler neck closure assembly that remains installed on a filler neck of a vehicle during refueling of a fuel tank of the vehicle More particularly, the present invention relates to liquid and vapor management and impact protection apparatus for a capless tank filler neck closure assembly.

A removable fuel cap with a sealing gasket is typically used to close the open end of a fuel tank filler neck. After an attendant fills the fuel tank and withdraws the pump nozzle from the filler neck, the fuel cap is attached to the filler neck so that a sealing gasket in the cap forms a seal between the fuel cap and the filler neck. Thus, the fuel cap closes the open end of the filler neck to block discharge of liquid fuel and fuel vapor from the fuel tank through the filler neck to the atmosphere. Fuel caps are often lost or damaged over time and, as a result, the open end of the filler neck might not be closed and sealed in accordance with original equipment specifications during operation of the vehicle. Filler neck closure assemblies that remain on a vehicle filler neck during refueling make vehicle refueling more convenient for consumers because no action other than inserting a pump nozzle through the closure assembly into the outer end of the filler neck is required to begin refueling a vehicle.

A robotic refueling system operates to detect a vehicle arriving at a vehicle-refueling station, locate a fuel tank filler neck in the vehicle, and move a fuel-dispensing pump nozzle automatically into and out of the filler neck at the proper times so that the fuel tank on board the vehicle can be filled with fuel without any manual movement or operation of the pump nozzle by an attendant. "Capless" filler neck closure assemblies may be configured to open automatically in response to engagement with a moving pump nozzle regardless of whether the pump nozzle is moved manually by an attendant or robotically by a robotic refueling system, and to close automatically after refueling is completed.

According to the present invention, a filler neck closure assembly for a vehicle fuel tank filler neck includes an internal housing formed to include a nozzle-receiving passage and adapted to be coupled to the filler neck. The filler neck closure assembly further includes a tank pressure control assembly coupled to the housing. The tank pressure control assembly normally closes the nozzle-receiving passage and is operable to open the nozzle-receiving passage. The housing includes a cylindrical side wall and at least a portion of the tank pressure control assembly is surrounded by the cylindrical side wall of the housing. A protective sleeve surrounds the cylindrical side wall to reinforce the cylindrical side wall. The sleeve shields the portion of the tank pressure control assembly surrounded by the cylindrical side wall.

In preferred embodiments, the protective sleeve is made of steel. The sleeve includes a hoop formed to include a cylindrical passageway receiving the tank pressure control assembly therein and a plurality of fold-over tabs appended to an outer end of the hoop and positioned to engage the housing.

Also in preferred embodiments, the filler neck closure assembly includes a sealing gasket having an "L-shaped" cross-section defined by an annular portion configured to engage and seal against an end of the internal housing in the filler neck closure assembly and a cylindrical sleeve portion configured to engage and seal against a portion of the cylindrical side wall of the internal housing adjacent to the end. The filler neck closure assembly also includes a ring of absorbent material positioned to lie between an outer shell and the housing and arranged to seal the closure assembly and absorb any liquid fuel spilled during refueling.

The filler neck closure assembly includes components that provide a grounding path for the dissipation of static electricity carried on the fuel-dispensing pump nozzle as the nozzle is inserted into the filler neck closure assembly. The outer shell of the filler neck closure assembly includes frangible tabs for enhanced and controlled breakability to minimize the chance that the filler neck will be opened due to an impact to the filler neck closure assembly during a vehicle crash. The outer shell of the closure assembly also includes a fluid drain apparatus that allows accumulated rain water, car wash water, or other fluid to drain out of the outer shell before it has a chance to leak into the filler neck and reach fuel stored in the fuel tank coupled to the filler neck.

Additional features and advantages of the present invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a perspective view of a vehicle and a diagrammatic illustration of a robotic refueling system showing the vehicle in a refueling zone, the vehicle including a fuel tank filler neck closure assembly in accordance with the present invention, the robotic refueling system including a vehicle detector and a filler neck detector coupled to a robotically-controlled pump nozzle assembly, and a pump nozzle of the pump nozzle assembly being positioned for insertion into a filler neck of the vehicle through the filler neck closure assembly;

FIG. 2 is a perspective view of the closure assembly of FIG. 1 showing an outer shell of the closure assembly having a nozzle-guiding surface, the outer shell including a nozzle-receiving opening, and a possible path (represented by a dotted line) of a tip of the pump nozzle on the nozzle-guiding surface through the nozzle-receiving opening during insertion of the pump nozzle into the closure assembly;

FIG. 3 is an exploded perspective view of the closure assembly of FIG. 2 showing the outer shell of the closure assembly at the top left corner of the page, the filler neck of the vehicle at the bottom right corner of the page, and components of the closure assembly arranged between the outer shell and the filler neck;

FIG. 11 is a side elevation view of the closure assembly of FIG. 1 after advancing the closure assembly into the filler neck by rotating the outer shell and threaded housing about an axis until an O-ring seal of the closure assembly is seated against an annular lip of a base of the filler neck but before the closure assembly is rotated relative to the filler neck to the preferred orientation;

FIG. 12 is a front elevation view of the closure assembly of FIG. 11;

FIG. 13 is an enlarged sectional view taken along line 13—13 of FIG. 12 showing a torque-override connection mechanism including drive teeth appended to a bottom side of the outer shell and a resilient finger appended to an annular flange of a portion of the closure assembly housing, the finger having a driven tooth in engagement with one of the drive teeth, and the finger deflecting (in phantom) in response to movement of the outer shell in the direction of the double arrow;

FIG. 14 is a side elevation view similar to FIG. 11 showing the outer shell after it has been rotated relative to the filler neck and relative to the filler neckengaging housing to its preferred orientation;

FIG. 15 is a front elevation view of the closure assembly of FIG. 12 showing the flapper door having optical properties that contrast with optical properties of the outer shell to create a "bullseye" pattern that facilitates the ability of the robotic refueling system to sense and locate the closure assembly precisely;

FIG. 17 is a bottom plan view of the bottom surface of the outer shell showing the drive teeth arranged in five separate groups, each group having seven teeth, the frangible tabs being delimited by four slots that extend radially from the nozzle-receiving opening of the outer shell, the groove that renders the tabs frangible being an arcuate groove which is generally concentric with the outer shell, the arcuate groove being positioned adjacent to ends of the four radially-extending slots, a lug being appended to a center frangible tab of the outer shell, and a spline that is appended to the pressure-relief valve plate arranged to engage the lug;

FIGS. 18–20 show the arcuate groove of the outer shell at various locations along the groove to illustrate that the arcuate groove is V-shaped and has varying depth along its length;

FIG. 18 is a sectional view of the outer shell taken along line 18—18 of FIG. 17 showing a first location of the arcuate groove wherein the arcuate groove is V-shaped having a first depth;

FIG. 19 is a sectional view of the outer shell taken along line 19—19 of FIG. 17 showing a second location of the arcuate groove wherein the arcuate groove is V-shaped having a second depth which is less than the first depth;

FIG. 20 is a sectional view of the outer shell taken along line 20—20 of FIG. 17 showing a third location of the arcuate groove wherein the arcuate groove is V-shaped having a third depth which is less than the second depth;

FIG. 21 is a sectional view of the pressure-relief valve plate taken along line 21—21 of FIG. 3 showing an annular valve seal beneath the pressure-relief valve plate, the annular valve seal being held in place relative to the pressure-relief valve plate by a pair of snap ribs which grasp opposing portions of an outer perimeter of a support ring to which the annular valve seal is affixed, and a flapper door hinge connector extending away from the pressure-relief valve seat and beyond the annular valve seat, the flapper door hinge connector being formed to include a slot that receives a portion of a spring that biases the flapper door;

FIG. 22 is a perspective view of the closure assembly showing that the engagement between the lug and the spline is visible when the closure assembly is tilted slightly at an angle to observe the area underneath the center frangible tab;

DETAILED DESCRIPTION OF THE DRAWINGS

Figure 4:
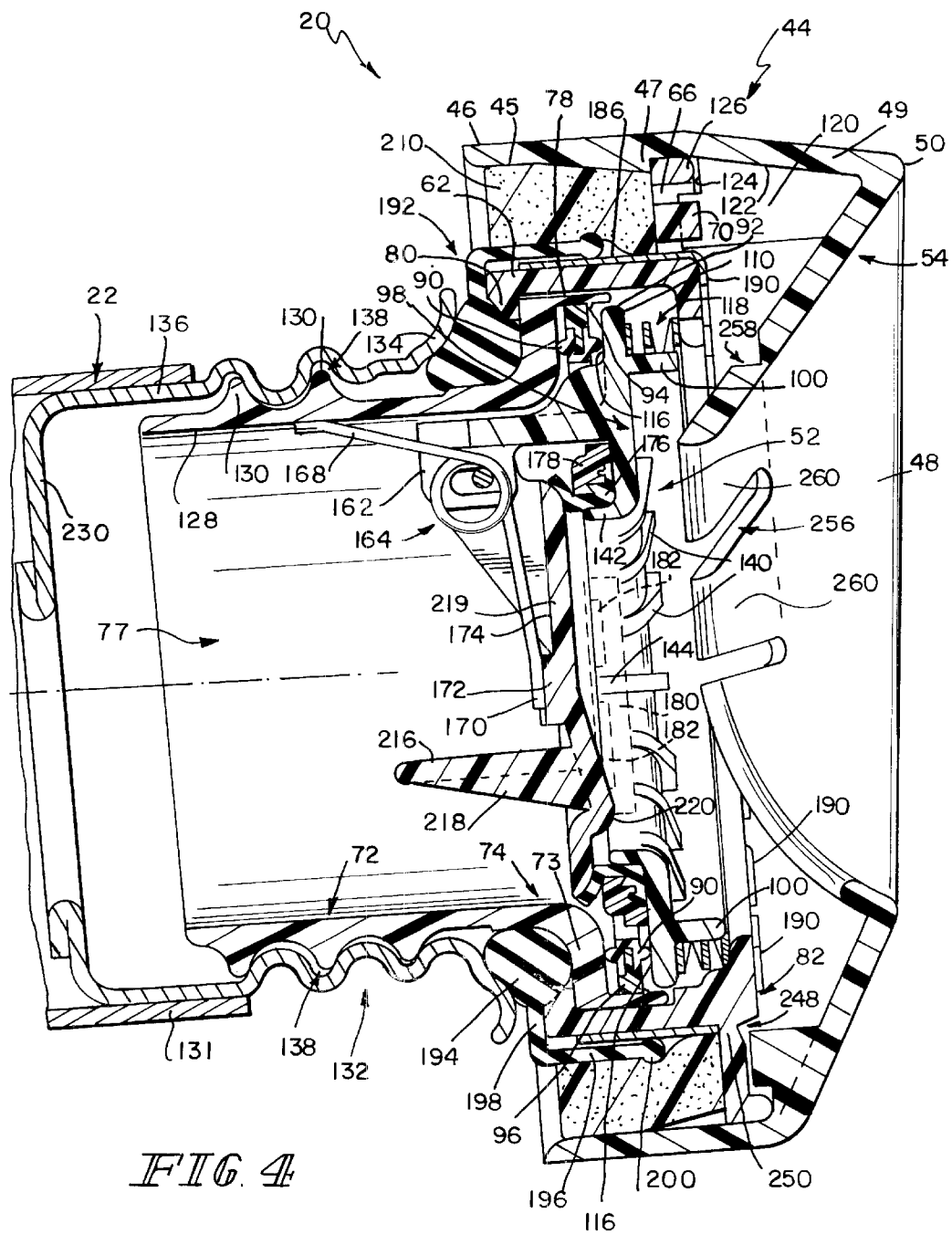
FIG. 4 is a sectional view of the closure assembly taken along line 4—4 of FIG. 2 after the closure assembly is installed in a filler neck, the components of the closure assembly being shown in filler-neck closing positions to block the discharge of liquid fuel and fuel vapor from the filler neck and to block admission of ambient air into the filler neck through passages formed in the closure assembly.

A vehicle 24 includes a fuel tank 26, a filler neck 22 extending from fuel tank 26, and a fuel tank closure assembly 20 in accordance with the present invention mounted to filler neck 22 as shown in FIG. 1. Closure assembly 20 is designed to replace a conventional fuel cap (not shown) so that vehicle 24 can be refueled by a driver of vehicle 24 or by an attendant without the need to remove closure assembly 20 before refueling. Closure assembly 20 also allows vehicle 24 to be refueled by a robotic refueling system 28 without the driver of vehicle 24 having to exit vehicle 24 to operate a conventional fuel pump (not shown). In addition, closure assembly 20 vents excess fuel vapor pressure from fuel tank 26 when the tank pressure increases to a certain level and closure assembly 20 allows ambient air into fuel tank 26 the atmosphere when the tank pressure decreases to a certain level.

Robotic refueling system 28 includes a nozzle-positioning sensor 34 that cooperates with a vehicle detector 30 to detect the presence of vehicle 24 within a refueling zone 32, shown in FIG. 1 (dashed lines). Vehicle detector 30 also detects the approximate location of closure assembly 20 after vehicle 24 has stopped within refueling zone 32. Robotic refueling system 28 includes a filler neck detector 36 that more precisely determines the location of closure assembly 20 so that a robotic conveyor 38 can guide a pump nozzle assembly 40 into engagement with closure assembly 20 allowing a nozzle 42 of pump nozzle assembly 40 to be inserted through closure assembly 20 to refuel vehicle 24. Robotic refueling system 28 may also include additional equipment (not shown) for opening a fuel door (not shown) that shields closure assembly 20 from view when the fuel door is closed.

Closure assembly 20 includes an outer shell 44 having a cylindrical side wall 46, a funnel-shaped front wall 48 having a circular outer ridge 50, and a boot-engaging wall 49 angling between side wall 46 and ridge 50 as shown in FIGS. 2 and 3. Front wall 48 is formed to include a nozzle-receiving opening 52. A nozzle-guiding surface 54 of front wall 48 angles between circular ridge 50 and nozzle-receiving opening 52. Nozzle-guiding surface 54 guides nozzle 42 into nozzle-receiving opening 52 as refueling system 28 inserts nozzle 42 into filler neck 22 through closure assembly 20. One possible path that a tip 56 of nozzle 42 may take during insertion of nozzle 42 through closure assembly 20 is shown by a dotted line 58 in FIG. 2.

An exploded perspective view of closure assembly 20 is provided in FIG. 3 to illustrate a preferred embodiment showing the various components of closure assembly 20. Outer shell 44 is mounted to an outer body 60. Outer body 60 includes a cylindrical side wall 62 formed to include a plurality of recesses 64 at a lower end of side wall 62. Outer body 60 also includes an annular flange 66 extending radially outwardly from a top end of side wall 62. Annular flange 66 is formed to include a plurality of resilient fingers 68 and ratchet teeth 70 appended to fingers 68. The illustrative annular flange 66 has six fingers 68 and six ratchet teeth 70 as shown in FIG. 3.

Closure assembly 20 also includes an inner body 72 that attaches to outer body 60 to form a housing 74. Inner body 72 includes an annular lip 73 having a first sealing surface 76 and a cylindrical wall 78 extending away from the outer perimeter of lip 73 as shown in FIG. 3. Cylindrical side wall 62 of outer body 60 is formed to include a series of snap ledges 80, shown, for example, in FIG. 4, that engage a bottom edge 81 of wall 78 to constrain axial movement of inner body 72 relative to outer body 60 when inner body 72 is coupled to outer body 60. Inner body 72 includes a plurality of tabs 75, each of which are received within respective recesses 64 of outer body 60 to constrain radial movement of inner body 72 relative to outer body 60. Thus, inner and outer bodies 72, 60 function as a single internal housing 74 having a passage 77 therethrough when coupled together. Because outer and inner bodies 60, 72 are separate pieces, housing 74 inherently has a vapor flow path which is defined between outer and inner bodies 60, 72.

An inner surface 45 of cylindrical side wall 46 of outer shell 44 is formed to include a plurality of snaps 47 and annular flange 66 of outer body 60 is retained in outer shell 44 by snaps 47 as shown, for example, in FIG. 4. Outer shell 44 includes a plurality of drive teeth 120, shown best in FIG. 17, that are appended to an inner surface 122 of boot-engaging wall 49. Each drive tooth 120 extends radially from surface 122 toward nozzle-receiving opening 52 of outer shell 44. Each drive tooth 120 also extends axially along surface 122 of boot-engaging wall as shown, for example, in FIGS. 18 and 19. Drive teeth 120 are arranged in five separate groups around the circumference of boot-engaging wall as shown in FIG. 17. Each group of drive teeth 120 includes seven drive teeth 120 and snaps 47 are positioned to lie between adjacent groups of drive teeth 120.

A ledge 124 is formed at the interface of surface 122 of wall 49 and surface 45 of side wall 46 and each drive tooth 120 includes a portion that extends beyond ledge 124 toward annular flange 66 of outer body 60, as shown, for example, in FIG. 4. Annular flange 66 of outer body 60 includes an outer perimetral ridge 126 that pilots on ledge 124. When housing 74 is mounted to outer shell 44, annular flange 66 is retained between snaps 47 and ledge 124 and ratchet teeth 70 intermesh with drive teeth 120. Ratchet teeth 70 and drive teeth 120 coact to provide a torque-override connection between housing 74 and outer shell 44 which allows outer shell 44 to rotate in one direction relative to housing 74 but not in an opposite direction as described below in more detail with reference to FIGS. 11–15.

Inner body 72 includes an elongated cylindrical side wall 128 extending away from the inner perimeter of lip 73 as shown in FIGS. 3 and 4. Side wall 128 is formed to include a thread 130. Filler neck 22 includes a pipe 131 and a base 132 secured to pipe 131. Base 132 includes a mouth 134 and a cylindrical side wall 136 extending from mouth 134, as shown in FIG. 3. Side wall 136 of base 132 is formed to include a helical groove 138 that receives thread 130 allowing closure assembly 20 to be screwed into base 132. It is within the scope of the invention, as presently perceived, for other structures, such as cams, ramps, flanges, or any other suitable coupling means for coupling closure assembly 20 to filler neck 22, to be used to couple closure assembly 20 filler neck 22 instead of threads 130.

Outer body 60 includes an annular lip 82 extending radially inwardly from the top end of annular flange 66 as shown in FIG. 3. An inner edge 85 of lip 82 is formed to include a plurality of notches 83 that can be used to position and transport outer body 60 during assembly of closure assembly 20. When closure assembly 20 is assembled, lip 82 is axially spaced apart from lip 73 of inner body 72 as shown, for example, in FIG. 4. Closure assembly 20 includes a tank pressure control assembly 84, a portion of which is retained between lip 82 of outer body 60 and lip 73 of inner body 72. Tank pressure control assembly 84 includes a pressure-relief valve subassembly 86 and a vacuum-relief valve subassembly 88 as shown in FIG. 3.

Pressure-relief subassembly 86 includes a pressure-relief valve seal 90 that seals against sealing surface 76 of inner body 72 as shown, for example, in FIG. 4. Seal 90 is rigidified by a support ring 96 to which seal 90 is affixed. Support ring 96 includes an outer perimeter 92, shown in FIG. 3, positioned to lie adjacent to cylindrical wall 78 of inner body 72 when seal 90 and support ring 96 are assembled into inner body 72. In addition, cylindrical wall 78 includes an annular snap ridge 94 that engages support ring 96 to retain support ring 96 and seal 90 within inner body 72.

Figure 7:
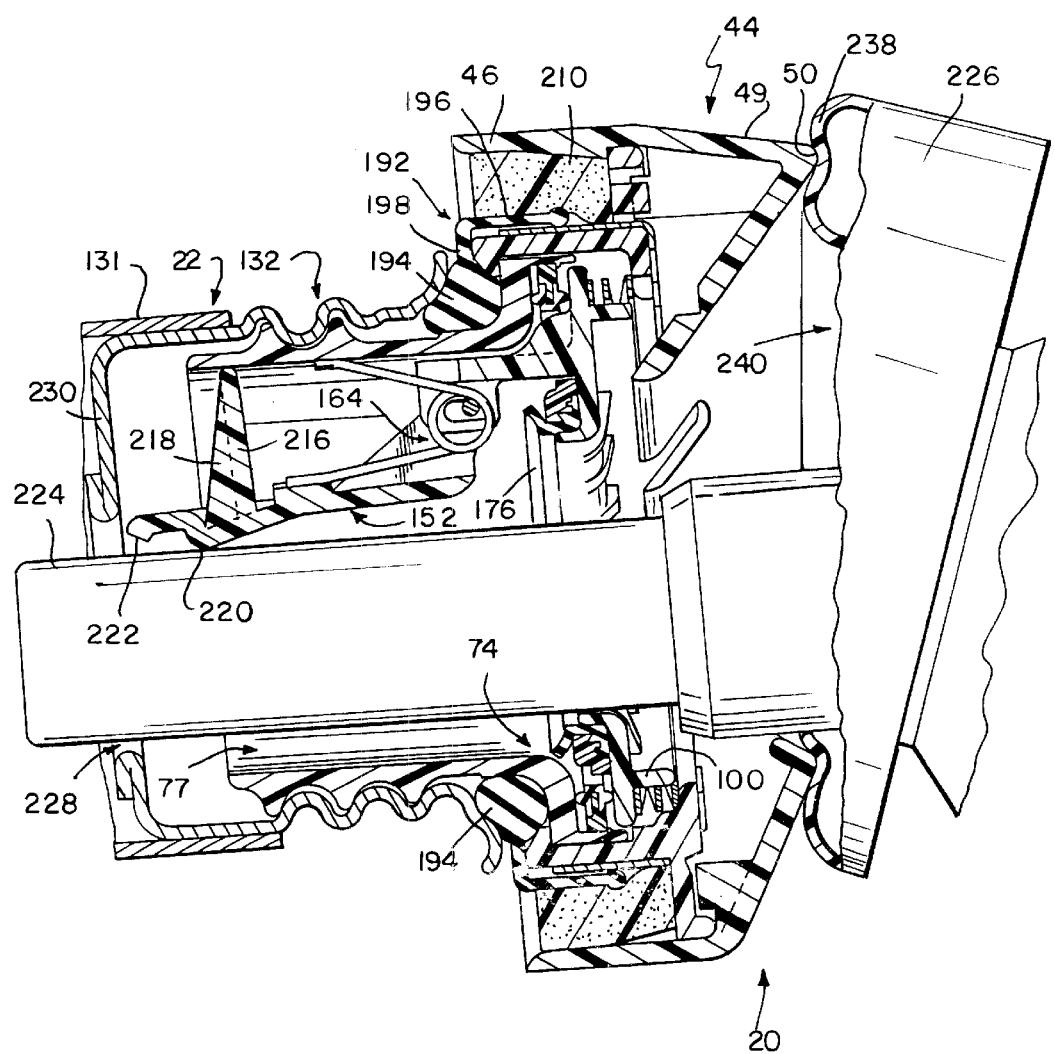
FIG. 7 is a view similar to FIG. 6 showing another type of pump nozzle extending through the closure assembly, this pump nozzle carrying an external fuel vapor recovery boot that engages an outer ridge of the outer shell when the pump nozzle is inserted into the filler neck.

Pressure-relief subassembly 86 also includes a pressure-relief valve plate 98 that is movable axially between seal 90 and lip 82 of outer body 60. Seal plate 98 includes a spring-piloting cylindrical wall 100, a sealing portion 110 extending radially outwardly from wall 100, and a nozzle-receiving portion 112 extending radially inwardly from wall 100 as shown in FIG. 3. Nozzle-receiving portion 112 is formed to include a nozzle-receiving opening 114 through which nozzle 42 can be inserted. Sealing portion 110 includes a sealing surface 116 that engages seal 90, as shown in FIG. 4, and that separates away from seal 90 when the pressure in fuel tank 26 and filler neck 22 reaches a certain level, as shown in FIG. 7, resulting in movement of seal plate 96 away from seal 90.

As shown in FIG. 4, pressure-relief subassembly 86 includes a compression spring 118 compressed between sealing portion 110 of valve plate 98 and lip 82 of outer body 60 adjacent to spring-piloting wall 100 of valve plate 98. Spring 118 engages lip 82 and sealing portion 110 to yieldably bias sealing surface 116 into contact with seal 90 as shown in FIG. 4. Thus, the pressure in fuel tank 26 must overcome the biasing force of spring 118 for sealing surface 116 of plate 98 to be moved away from seal 90. Spring 118 can be made from a single piece of wavy flat metal that is coiled in a helical arrangement so that peaks of one portion of the coil engage the valleys of the next adjacent portion of the coil as shown in FIG. 3. However, it is within the scope of the invention as presently perceived for other types of springs to be used to bias sealing surface 116 of valve plate 98 into contact with seal 90.

As shown in FIG. 3, nozzle-receiving portion 112 of plate 98 includes a plurality of radially-extending nozzle-directing ribs 140. A portion of each nozzle-directing rib 140 adjacent to nozzle-receiving opening 114 slopes into a seal-piloting wall 142, shown in FIG. 4, which defines nozzle-receiving opening 114. Ribs 140 further direct nozzle 42 as nozzle 42 is inserted through closure assembly 20. Two ribs 140 do not slope into wall 142 but instead include portions 144 that project radially away from wall 142 by a slight amount. Projecting portions 144 oppose one another, as shown in FIGS. 3, 12, 15, and 21, and ensure that a gap exists between nozzle 42 and seal-piloting wall 142 of plate 98 when nozzle 42 extends through opening 114 so that fuel vapor can vent around nozzle 42 through the gap during refueling of vehicle 24.

Nozzle-receiving portion 112 of plate 98 further includes a spline 146 projecting radially inwardly from spring-piloting wall 100 as shown in FIG. 3. Outer shell 44 is formed to include a lug 148 that engages spline 146 as shown in FIGS. 17 and 22 so that when outer shell 44 is rotated in a closure-advancing direction, indicated by double arrow 150 also shown in FIGS. 17 and 22, plate 98 rotates in direction 150 due to the engagement of lug 148 with spline 146. When the closure assembly 20 is tilted slightly at an angle to observe the area between outer shell 44 and plate 98, both spline 146 and lug 148 are visible as shown in FIG. 22.

Vacuum-relief valve subassembly 88 includes a flapper door 152. Pressure-relief valve plate 98 is formed to include a flapper door hinge connector 154 that extends away from sealing surface 116 through seal 90. A pair of spaced-apart arms 156 are appended to flapper door 152 and each arm 156 is formed to include a. pin-receiving slot 158. Hinge connector 154 is received between arms 156 so that a pair of apertures 160 formed in side tabs 162 of hinge connector are aligned with slots 158 of arms 156. A torsion spring 164 is received between side tabs 162 of hinge connector 154 and a pin 163 extends through slots 158 of arms 156, a coiled portion of spring 164, and apertures 160 of side tabs 162 to pivotably connect flapper door 152 and spring 164 to plate 98.

Vacuum-relief valve subassembly 88 further includes a vacuum-relief valve seal 176 affixed to a support ring 178. A pair of snap ribs 180 are appended to plate 98 and extend away from sealing surface 116 as shown in FIG. 21. Snap ribs 180 are positioned between seal-piloting wall 142 and the annular portion of surface 116 that seal 90 engages under the biasing of spring 118. Each snap rib 180 extends circumferentially through arc of approximately forty five degrees (450), as shown in FIG. 4 (in phantom), in concentric relation with nozzle-receiving opening 114. Each snap rib 180 is formed to include a pair of snaps 182 that extend radially inwardly from ribs 180. Snaps 182 engage opposing portions of an edge 184 of support ring 178 to retain support ring 178 and seal 176 relative to plate 98 as shown in FIG. 21.

Hinge connector 154 is formed to include a slot 166 as shown in FIGS. 3 and 21. During the assembly of flapper door 152 to plate 98, a first end 168 of spring 164 is received by slot 166 in the orientation shown in FIG. 3 having first end 168 of spring 164 generally parallel with sealing surface 116 of plate 98. A second end 170 of spring 164 is positioned to engage a raised boss 172 which is appended to an inner surface 174 of flapper door 152 as shown, for example in FIG. 4.

After seal 90 and support ring 96 have been mounted in inner body 72, but prior to inner body 72 being connected to outer body 60, compression spring 118 and plate 98 with flapper door 152, seal 176, and support ring 178 attached thereto are positioned between lip 82 of outer body 60 and lip 73 of inner body 72. As inner body 72 and outer body 60 are assembled together to form housing 74, first end 168 of spring 164 is pivoted relative to pin 163 so as to torsionally load spring 164. Spring 164 is held in its loaded condition due to engagement of first end 168 of spring 164 with side wall 128 of inner body 72 and due to engagement of second end 170 of spring 164 with raised boss 172 of flapper door 152. Thus, when inner and outer bodies 72, 60 are coupled together having seal 90, support ring 96, valve plate 98, and spring 118 sandwiched therebetween, torsion spring 164 acts to close flapper door 152 against seal 176 as shown in FIG. 4.

Closure assembly 20 further includes a sleeve 185 as shown best in FIG. 3. Sleeve 185 is preferably made from a strong material such as steel. Sleeve 185 includes a hoop 186 that surrounds cylindrical side wall 62 of outer body 60 and encompasses tank pressure control assembly 84 contained within housing 74, as shown in FIG. 4. Annular flange 66 of outer body 60 includes a plurality of slots associated with each of resilient fingers 68 and sleeve 185 includes a plurality of fold-over tabs 190 appended to hoop 186 as shown in FIG. 3. Each tab 190 extends through a respective slot 188 formed in annular flange 66 and is folded down against lip 82 as shown, for example, in FIG. 4 so that a first portion of each tab 190 is positioned to lie within an associated slot 188 and a second portion of each tab 190 is angled with respect to the respective first portion to secure sleeve 185 relative to housing 74. Hoop 186 includes edges 191 between tabs 190 as shown in FIG. 3. Edges 191 engage annular flange 66 to further secure sleeve 185 relative to housing 74.

Outer body 60, inner body 72, valve plate 98, flapper door 152, support ring 96, and support ring 178 all can be made from an engineering plastics material, although each of these listed components need not necessarily be made from the same engineering plastics material. Hoop 186 decreases the likelihood that components 60, 72, 98, 152, 96, 178 will be damaged when closure assembly 20 is subjected to an impact of the type that might occur, for example, during an accident of vehicle 24. If any of components 60, 72, 98, 152, 96, 178 do happen to sustain damage during an impact, hoop 186 helps to retain the damaged components together thus minimizing possible damage to other components of closure assembly 20 and maximizing the ability of closure assembly 20 to function normally.

Closure assembly 20 includes a sealing gasket 192 having a somewhat "L-shaped" cross-section defined by an O-ring or annular portion 194 and a sleeve portion 197. Sleeve portion 197 includes a resilient cylindrical side wall portion 196, and a resilient annular connector portion 198 connecting side wall portion 196 to O-ring portion 194 as shown in FIG. 3. O-ring portion 194 forms a seal between mouth 134 of base 132 and housing 74 of closure assembly 20 when closure assembly 20 is installed on base 132. Side wall portion 196 and connector portion 198 cooperate with O-ring portion 194 to seal the vapor flow path that inherently exists between inner body 72 and outer body 60. Thus, side wall portion 196 encompasses a portion of hoop 186, outer body 60, and inner body 72.

During the assembly of sealing gasket 192 onto housing 74, side wall portion 196 is folded back relative to O-ring portion 194 to a position opposite to that shown in FIGS. 3 and 4. A "spinner" machine (not shown) then spins sealing gasket 192 about an axis 195 so that O-ring portion 194 advances along thread 130 into engagement with bottom edge 81 of inner body 72. After O-ring portion has been spun into engagement with bottom edge 81 of inner body 72, side wall portion 196 is then returned to the position shown in FIGS. 3 and 4 to seal against side wall 62 of outer body 60 and hoop 186. Sealing gasket 192 includes a top bead 200 that assists the folding movement of side wall portion 196 and that assists the ability of side wall portion 196 to seal against hoop 186.

Closure assembly 20 additionally includes a foam ring 210 wedged between cylindrical side wall 46 of outer shell 44 and housing 74 as shown in FIG. 4. Foam ring 210 sealingly engages inner surface 45 of side wall 46, sealingly engages side wall portion 196 of sealing gasket 192, and sealingly engages hoop 186. In addition, foam ring 210 functions to absorb shocks applied to outer shell 44 during vehicle accidents to minimize transmission of shock forces from outer shell 44 to housing 74 thus increasing the ability of closure assembly 20 to sustain an impact without damage to the components of closure assembly 20.

Figure 6:
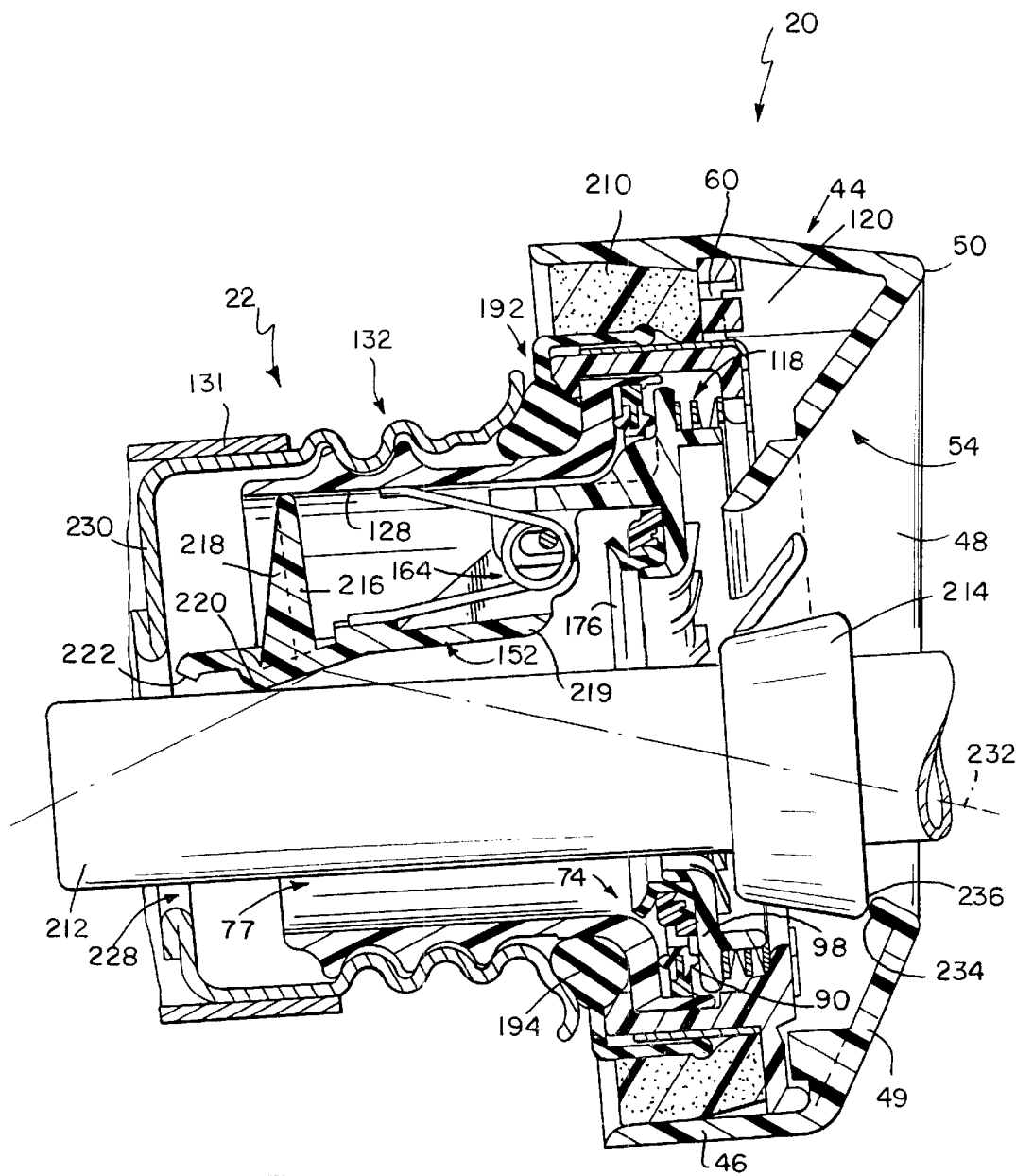
FIG. 6 is a view similar to FIG. 4 showing the pump nozzle extending through a nozzle-receiving opening formed in the outer shell to move the spring-biased flapper door relative to the pressure-relief valve plate to an opened position, the pump nozzle extending through an opening formed in the pressure-relief valve plate and into the filler neck through a passage formed in a housing included in the closure assembly and configured to engage the filler neck, and the flapper door having a standoff rib that engages the housing to limit the amount by which the flapper door can open so that the flapper door stops at a position which helps to guide the pump nozzle into the filler neck.

Pump nozzle 42 can be inserted through closure assembly 20 and into filler neck 22 to refuel vehicle 24 as previously described. Closure assembly 20 is compatible with many styles of pump nozzles in addition to pump nozzle 42. For example, a pump nozzle 212 having a collar 214 can be inserted through closure assembly 20 as shown in FIG. 6 and a pump nozzle 224 having an external fuel vapor recovery boot 226 can be inserted through closure assembly 20 as shown in FIG. 7. Additionally, a pump nozzle made of rubber and having a brass tip can be inserted through closure assembly 20. The description below of the interaction between pump nozzle 42 and closure assembly 20 applies as well to pump nozzles 212, 224, as well as the rubber pump nozzle unless specifically noted otherwise.

When the pump nozzle 42 is inserted through closure assembly 20, the pump nozzle 42 passes through nozzle-receiving opening 52 of outer shell 44 and engages flapper door 152. Continued inward movement of pump nozzle 42 pivotably opens flapper door 152 about pin 163 against the spring-bias of spring 164 and pump nozzle 42 extends through nozzle-receiving opening 114 formed in valve plate 98.

In preferred embodiments of closure assembly 20, both flapper door 152 and inner body 72 are made from a statically conductive grounding material, such as conductive acetal containing carbon powder filler or carbon fiber filler, and spring 164 is made from a metallic conductor. The engagement of spring 164 with both inner body 72 and flapper door 152 electrically couples flapper door 152 to inner body 72 and the engagement of threads 130 of inner body 72 with base 132, which is made from a metal material, electrically couples inner body 72 to base 132. The electrical coupling of door 152 to base 132 through spring 164 and inner body 172 provides a grounding path for the dissipation of static electricity that would otherwise be stored in closure assembly 20. The electrical coupling of door 152 to base 132 also provides a grounding path 179 for any static electricity associated with the pump nozzle when contact is made between door 152 and pump nozzle 42.

Figure 5:
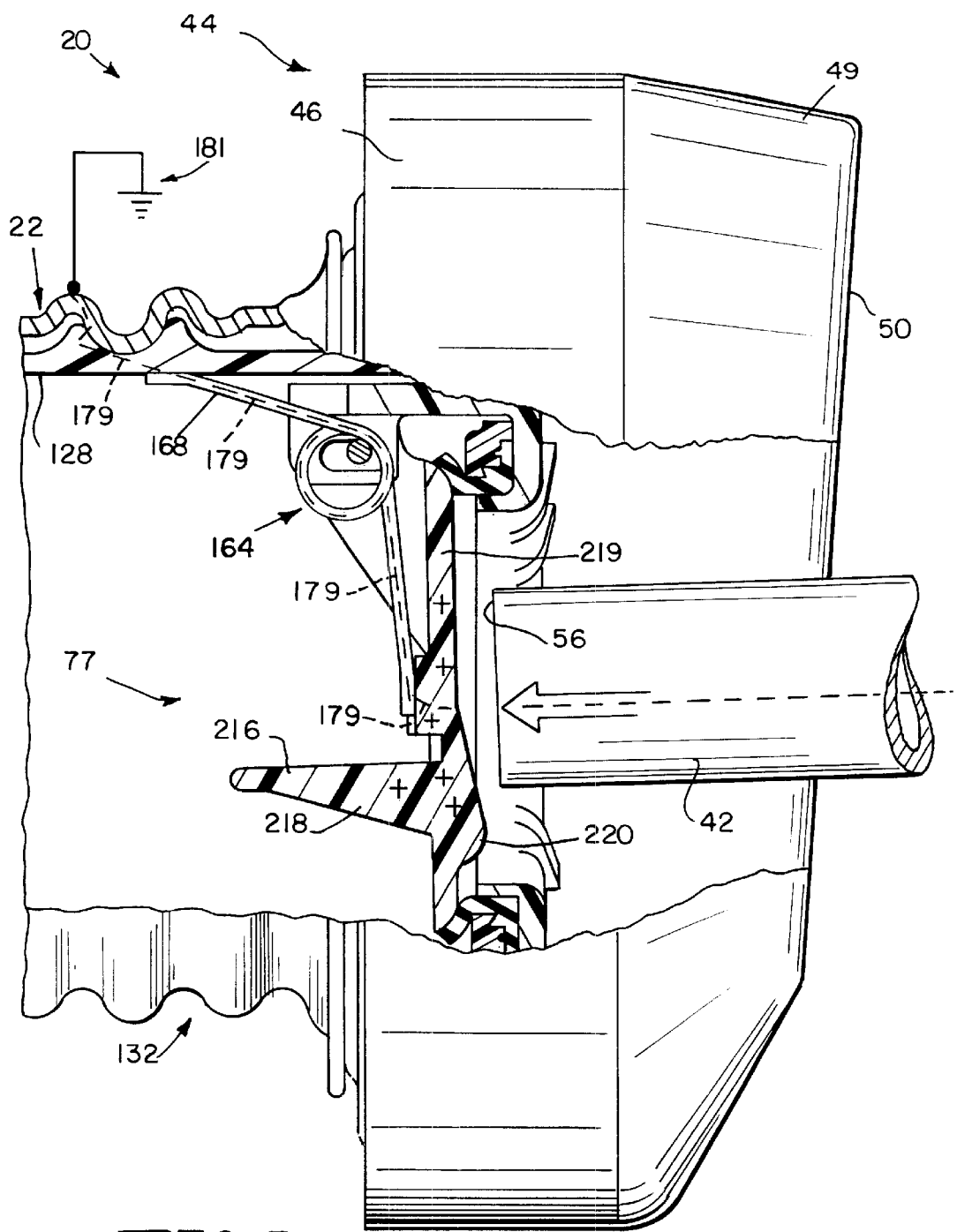
FIG. 5 is a side elevation view of the closure assembly of FIG. 2, with portions broken away, showing a pump nozzle extending through a nozzle-receiving opening formed in the outer shell, the pump nozzle approaching a spring-biased flapper door that is pivotably mounted to a pressure-relief valve plate, the pump nozzle being charged with negative static electricity, the flapper door being charged with positive static electricity, and a grounding path (in phantom) being provided by the closure assembly to the vehicle filler neck.

Thus, if the tip 56 of pump nozzle 42 has a static electrical charge opposite to the static electrical charge of flapper door 152, as shown in FIG. 5 with flapper door 152 having a positive charge and the tip 56 of nozzle 42 having a negative charge, nozzle 42 will be electrically coupled to ground 181 of the vehicle through grounding path 179 upon contact of the tip of nozzle 42 with flapper door 152. Electrically coupling nozzle 42 to vehicle ground 181 in this manner causes nozzle 42, base 132, and filler neck 22 to be at substantially equivalent electric potentials which minimizes the likelihood that a spark will occur between nozzle 42 and either base 132 or filler neck 22 after insertion of nozzle 42 through housing 74 of closure assembly 20.

A standoff rib 216 is appended to inner surface 174 of flapper door 152 and extends therefrom adjacent to raised boss 172. A support web 218 extends between standoff rib 216 and flapper door 152 to rigidify standoff rib 216. When flapper door 152 opens in response to insertion of pump nozzle 42 through closure assembly 20, standoff rib 216 engages side wall 128 of inner body 72 as shown, for example, in FIG. 6. Engagement of standoff rib 216 with side wall 128 prevents flapper door 152 from opening any further. Flapper door 152 includes a bump 220 that ensures that a sealing surface 222 of flapper door 152 is held in spaced-apart relation to pump nozzle 42 to prevent pump nozzle 42 from damaging sealing surface 222. Engagement of standoff rib 216 with side wall 128 of inner body 72 of housing 74 orients flapper door 152 in a position that guides pump nozzle 42 through an opening 228 in an unleaded discriminator portion 230 of base 132. For example, pump nozzle 42 may follow a path indicated by dotted line 232, shown in FIG. 6, when entering filler neck 22 through closure assembly 20.

Thus, flapper door 152 includes a circular disk portion 219 and bump 220 is appended to the disk portion 219. In preferred embodiments, flapper door 152 is made as a single integral piece so that the thickness of the disk portion 219 of flapper door 152 is substantially equivalent to the thickness of the material comprising bump 220. In addition, standoff rib 216 is appended to bump 220 and extends therefrom in perpendicular relation with the disk portion 219 of flapper door 152. Web 218 is also appended to bump 220. Web 218 rigidifies both bump 220 and standoff rib 216.

Figure 8:
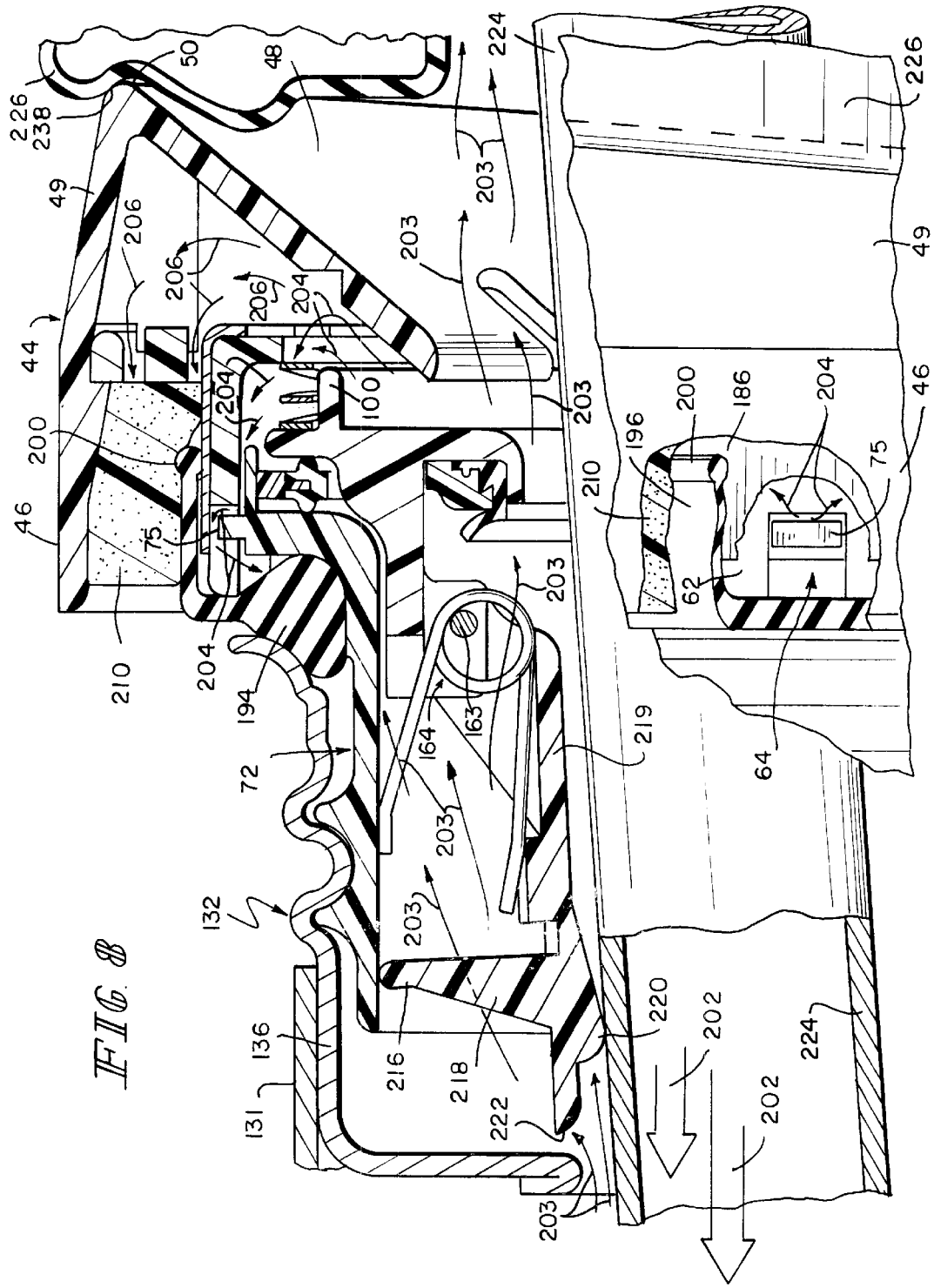
FIG. 8 is an enlarged side elevation view of the closure assembly of FIG. 7, with portions broken away, showing displaced fuel vapor flowing through the passage of the housing, some of the displaced vapor flowing into the external fuel vapor recovery boot, and the closure assembly including sealing apparatus that prevents fuel vapor from flowing between the housing and the outer shell away from the external fuel vapor recovery boot.

Outer shell 44 includes a catch lip 234 so that when nozzle 212 having collar 214 is used to refuel vehicle 24, catch lip 234 engages an edge 236 of collar 214 to hold nozzle 212 in place while vehicle 24 is refueled as shown in FIG. 6. When nozzle 224 is used to refuel vehicle 24, as shown in FIGS. 7 and 8, a perimetral surface 238 of external fuel vapor recovery boot 226 engages ridge 50 all the way around ridge 50 so that as liquid fuel 202 enters fuel tank 26 to displace fuel vapor 203 out of filler neck 22 through closure assembly 20 around nozzle 224 as shown in FIG. 8, the displaced fuel vapor 203 flows into a vapor recovery system (not shown) through a bore 240 of vapor recovery boot 226 without the fuel vapor 203 leaking to the atmosphere through any space located between boot 226 and outer shell 44.

Sealing gasket 192 and foam ring 210 prevent fuel vapor from leaking past outer shell 44 around housing 74 to the atmosphere instead of into vapor recovery boot 226. During refueling with a vapor recovery system, including nozzle 224 and vapor recovery boot 226, a portion of the displaced fuel vapor, represented by arrows 204 in FIG. 8, is able to flow through the vapor flow path between inner and outer bodies 60, 72 of housing 74. However, sleeve portion 197 of sealing gasket 192 blocks the flow of fuel vapor 204 to prevent fuel vapor 204 from escaping inadvertently to the atmosphere. In addition, during refueling with a vapor recovery system, including nozzle 224 and vapor recovery boot 226, some of the displaced fuel vapor, represented by arrows 206 in FIG. 8, is able to flow through slots 188 formed in annular flange 66. However, foam ring 210 blocks the flow of fuel vapor 206 to prevent fuel vapor 206 from escaping inadvertently to the atmosphere.

In addition to performing a sealing function, foam ring 210 performs a liquid fuel absorption function. If any liquid fuel drips from pump nozzle 42 as it is being inserted into or withdrawn from closure assembly, foam ring 210 absorbs the dripped liquid fuel that comes into contact therewith. Absorption of the dripped liquid fuel by foam ring 210 minimizes the odor typically associated with dripped liquid fuel. The dripped liquid fuel eventually evaporates from foam ring 210.

Figure 9:
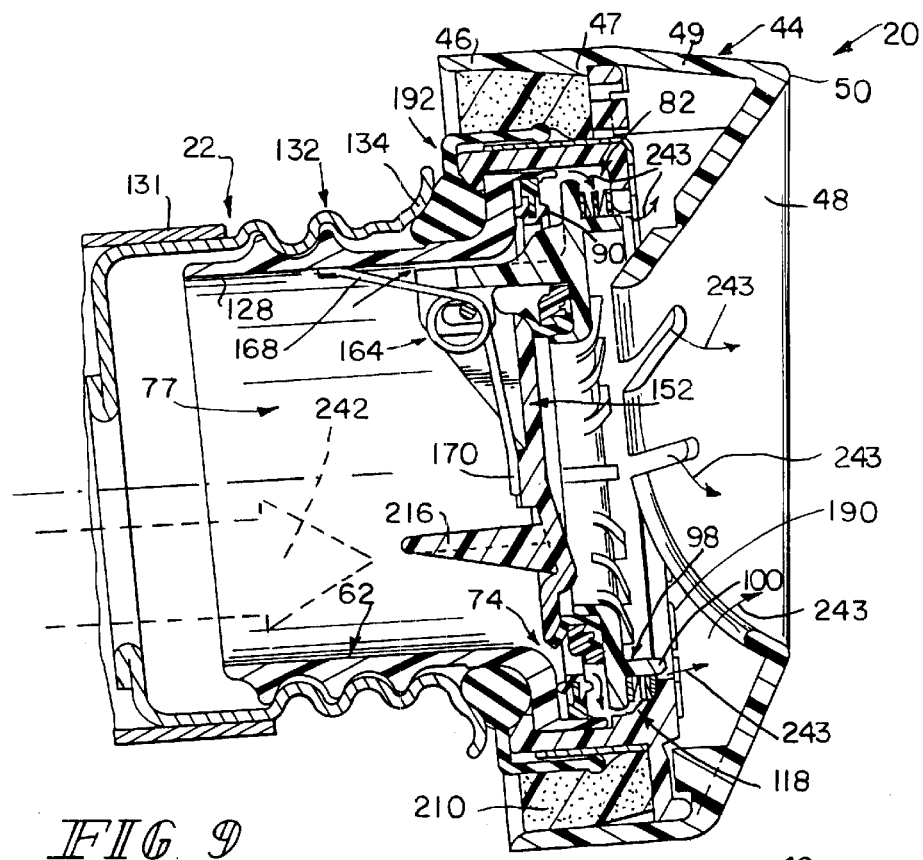
FIG. 9 is a view similar to FIG. 4 showing the pressure-relief valve plate moved away from a seal that is carried by the filler neck-engaging housing, the pressure-relief valve plate moving in response to excess pressure that has built up in the filler neck (represented by the dashed double arrow), a vent path through the closure assembly being created by the movement of the pressure-relief valve plate away from the seal, the vent path allowing the flow of pressurized fuel vapor out of the filler neck around a perimeter of the pressure-relief valve plate, and through the nozzle-receiving opening of the outer shell.

When flapper door 152 is closed against valve seal 176 under the spring bias of spring 164 after the conclusion of vehicle refueling operations and when the fuel vapor pressure within filler neck 22 increases to the point where the spring-bias force of compression spring 118 is overcome by the increased fuel vapor pressure, as indicated by a dashed double arrow 242 shown in FIG. 9, valve plate 98 moves away from seal 90 toward lip 82 of outer body 60 further compressing spring 118. The fuel vapor pressure within filler neck 22 may increase due to heating of the fuel (not shown) stored in fuel tank 26 which increases the presence of fuel vapor in filler neck 22 and fuel tank 26. When valve plate 98 moves away from seal 90 in response to the increased pressure built up in the filler neck 22, a vent path is created between seal 90 and valve plate 98 so that the pressurized fuel vapor can vent around valve plate 98 and through nozzle-receiving opening 52 of the outer shell 44 as indicated by a series of single arrows 243 shown in FIG. 9.

Figure 10:
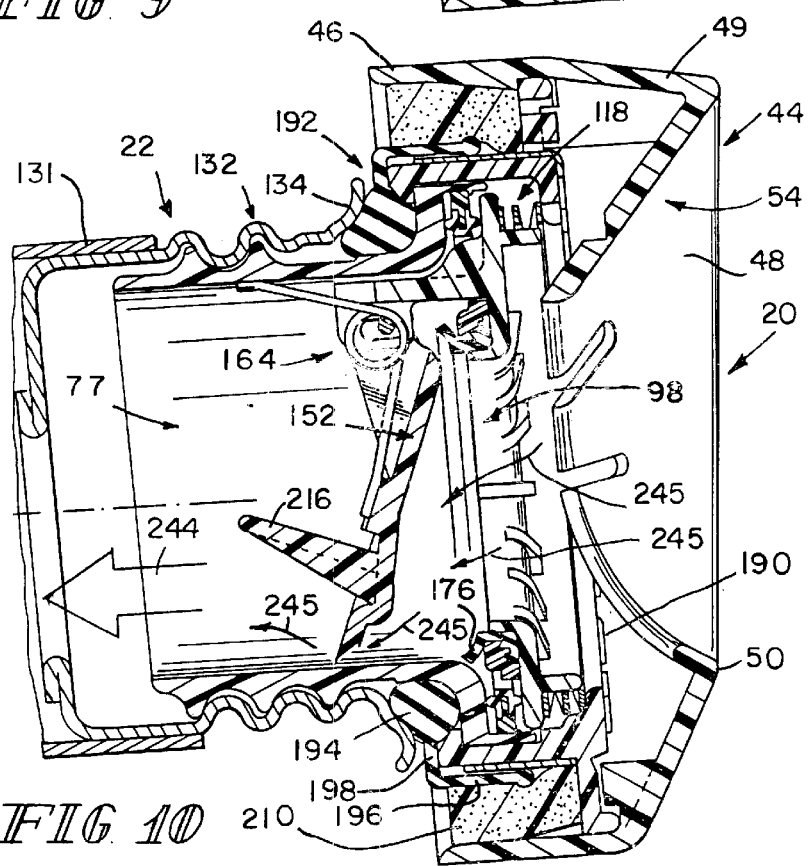
FIG. 10 is a view similar to FIG. 9 showing the spring-biased flapper door pivoted open relative to the pressure-relief valve plate to assume a vacuum-relief position due to the presence of a vacuum in the filler neck (represented by a double arrow), a vacuum-relief path through the closure assembly being created by the movement of the flapper door away from the pressure-relief valve plate, the vacuum-relief path allowing the flow of ambient air from the outside atmosphere into the filler neck through the closure assembly.

When valve plate 98 is closed against seal 90 under the spring bias of spring 118 after the conclusion of vehicle refueling operations and when the pressure within filler neck 22 decreases to the point where the spring-bias force of torsion spring 164 is overcome by the decreased pressure, as indicated by a double arrow 244 shown in FIG. 10, flapper door 152 pivots about pin 163 away from seal 176 further loading spring 164. The fuel vapor pressure within filler neck 22 may decrease due to cooling of the fuel (not shown) stored in fuel tank 26 which may occur, for example, at night when the ambient temperature typically drops. When flapper door 152 pivots away from seal 176 in response to the decreased pressure created in the filler neck 22, a vent path is created between seal 176 and flapper door 152 so that the ambient air can vent through nozzle-receiving opening 52 of the outer shell 44 and around flapper door 152 into closure assembly 20 as indicated by the series of single arrows 245 shown in FIG. 10.

When closure assembly 20 is installed into base 132 which is secured to filler neck 22, closure assembly 20 is rotated in closure-advancing direction 150 as previously described. During the initial stages of installing closure assembly 20 into base 132, frictional engagement of ratchet teeth 70 of outer body 60 with drive teeth 120 of outer shell 44 provides sufficient torque between outer shell 44 and housing 74 to cause outer shell 44 and housing 74 to rotate together about axis 195 in direction 150. In addition, engagement of lug 148 of outer shell 44 with spline 146 of valve plate 98 causes tank pressure control assembly 84 to rotate together with outer shell 44 about axis 195 in direction 150.

Figure 11:
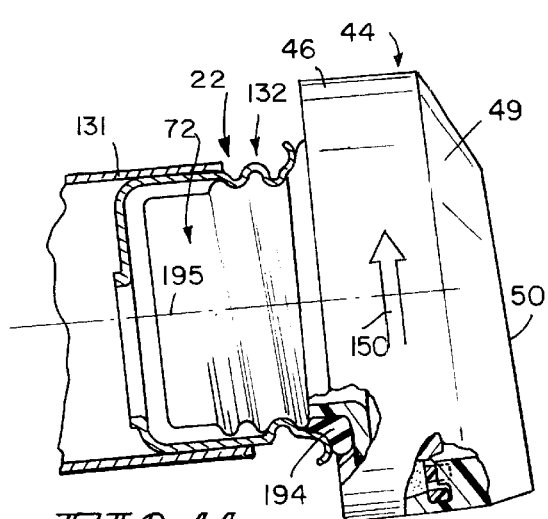
FIGS. 11–15 show the outer shell of the closure assembly of FIG. 2 in various positions as it is rotated relative to the filler neck toward a preferred orientation after the insertion of the closure assembly into the filler neck.
Figure 12:
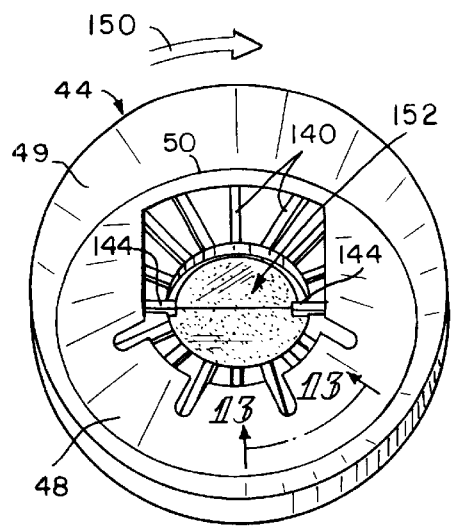

When O-ring portion 194 of sealing gasket 192 firmly seats against mouth 134 of base 132 and thread 130 firmly wedges against side wall 136 of base 132 within groove 138, housing 174 can no longer rotate in direction 150 relative to base 132 and filler neck 22 about axis 195. However, outer shell 44 and tank pressure control assembly 84 may be in an unpreferred orientation as shown in FIGS. 11 and 12.

Figure 13:
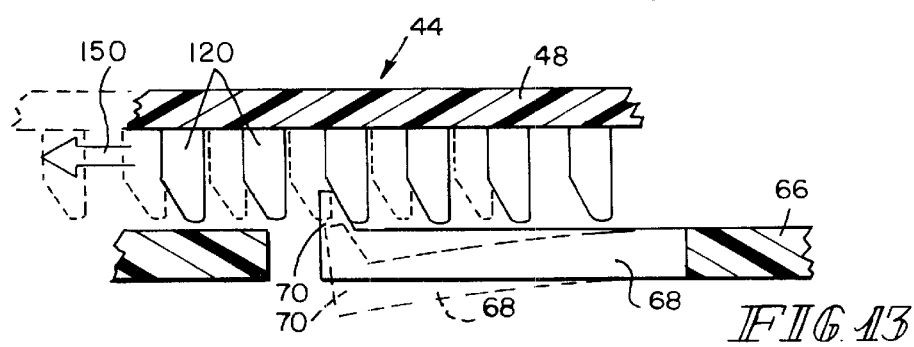

Ratchet teeth 70, resilient fingers 68, and drive teeth 120 cooperate to provide closure assembly 20 with a torque-override mechanism that allows outer shell 44 and tank pressure control assembly 84 to rotate in direction 150 relative to housing 74. Continued rotation of outer shell 44 in direction 150 when housing 74 is firmly seated against sealing gasket 192 causes rotation of tank pressure control assembly 84 due to the engagement of lug 148 with spline 146. In addition, continued rotation of outer shell 44 in direction 150 when housing 74 is firmly seated against sealing gasket 192 causes drive teeth 120 to move relative to ratchet teeth 70 and resilient fingers 68 thereby causing fingers 68 to deflect and undeflect as each drive tooth passes each ratchet tooth 70. This ratcheting effect is characterized by a "clicking" noise which is generated as teeth 120 are moved across teeth 70 as shown in FIG. 13.

During rotation of outer shell 44 and valve plate 98 about axis 195 in direction 150 while housing 74 is firmly seated against sealing gasket 192, seal 90 has a portion in contact with valve plate 98, which is moving, and a portion in contact with annular lip 73, which is stationary. Support ring 96 rigidifies seal 90 and securely couples seal 90 to cylindrical wall 78 so that seal 90 is prevented from buckling and prevented from turning relative to housing 74 as valve plate 98 is rotated about axis 195 in direction 150 during the torque-override stage of the installation of closure assembly 20 in filler neck 22.

Figure 14:
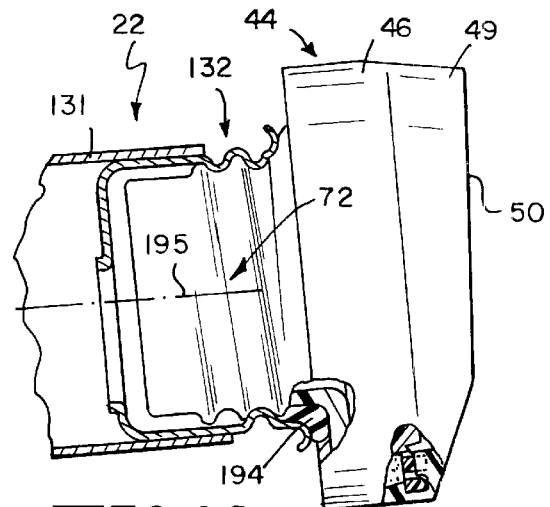
Figure 15:
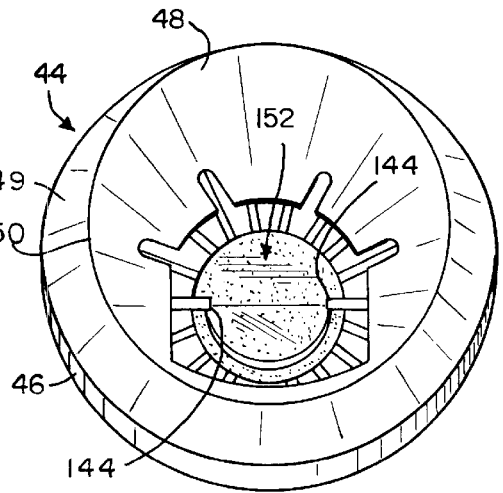

After outer shell 44 and tank pressure control assembly 84 have been rotated relative to filler neck 22 and base 132 to a preferred orientation, as shown in FIGS. 14 and 15, flapper door 152 is oriented so that pin 163 is positioned to lie above nozzle-receiving aperture 114 in a horizontal orientation so that when flapper door 152 swings open and standoff rib 216 engages wall 128 of inner body 72, flapper door is appropriately positioned to guide pump nozzle 42 through opening 228. Nozzle-receiving opening 114 of valve plate 98 has a central axis 246 that is offset from axis 195 of closure assembly 20, as shown in FIG. 3, which requires that outer shell 44 and tank pressure control assembly 84 be in the preferred orientation or approximately therein for flapper door 152 to serve its proper nozzle-guiding function when standoff rib 216 engages wall 128.

When outer shell 44 and tank pressure control assembly 84 are in the preferred orientation, flapper door 152 and outer shell 152 cooperate to create a "bullseye" pattern as shown in FIG. 15. Flapper door 152 has optical properties that contrast with optical properties of outer shell 44 to facilitate the ability of robotic refueling system 28 to sense and locate closure assembly 20 precisely. One way for flapper door 152 and outer shell 44 to have differing optical properties is for flapper door 152 to have a dark color, such as black, and for outer shell to have a lighter color, such as white or gray. Alternatively, flapper door 152 and outer shell 44 may have differing reflective properties or surface texture to achieve the desired result of dissimilar optical properties.

Outer body 60 includes an annular groove 248 at the interface between annular flange 66 and annular lip 82 as shown, for example, in FIGS. 3 and 4. Groove 248 results in the connection between flange 66 and lip 82 being somewhat weakened due to the reduced material thickness in the vicinity of groove 248. Thus, flange 66 includes a frangible portion 250 that enhances the separation of flange 66 from lip 82 if closure assembly 20 is subjected to an impact in excess of a certain limit, as represented, for example, by double arrows 252 shown in FIG. 16.

Figure 16:
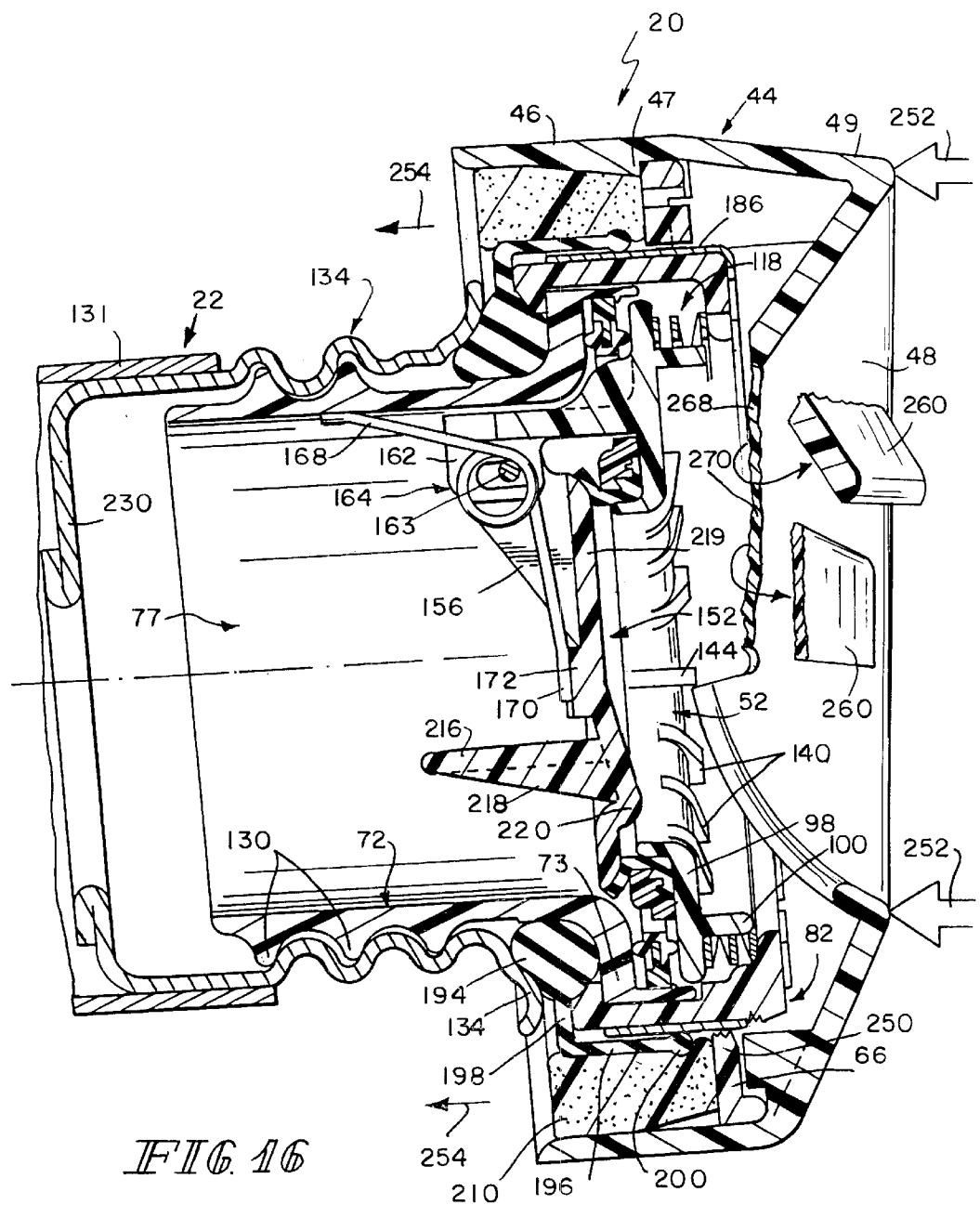
FIG. 16 is a view similar to FIG. 4 showing the outer shell breaking away from the filler neck-engaging housing due to an impact (represented by two double arrows) and moving toward the filler neck (represented by two single arrows), frangible inner tabs of the outer shell breaking away from the rest of the outer shell along a groove formed in the outer shell due to contact of the frangible tabs with the pressure-relief valve plate, and the breaking away of the frangible tabs allowing the housing, pressure-relief valve plate, and flapper door to be left intact and in a closed position continuing to close the filler neck.

When subjected to impact force 252, frangible portion 250 fractures between flange 66 and lip 82 so that flange 66 and outer shell 44 move in a direction toward filler neck 22 as indicated by arrows 254 shown in FIG. 16. The fracturing of frangible portion 250 by impact force 252, prevents other components of closure assembly 20 from being damaged by impact force 252 allowing the sealing and venting functions of closure assembly to continue after impact force 252.

Front wall 48 of outer shell 44 includes four slots 256 extending radially outwardly from nozzle-receiving opening 52. An arcuate groove 258 is formed in front wall 48 just beyond slots 256 as shown best in FIG. 17. Groove 258 cooperates with slots 256 to provide outer shell 44 with a plurality of frangible tabs 260. Groove 258 and slots 256 enhances the controlled separation of frangible tabs 260 from front wall 48 of outer shell 44 if closure assembly 20 is subjected to impact force 252 as shown in FIG. 16.

When outer shell 44 moves in direction 254 in response to impact force 252, frangible tabs 260 engage valve plate 98 and fracture along groove 258. As shown in FIG. 16 with reference to two of frangible tabs 260, one of frangible tabs 260 fractures along a region 268 of outer shell 44 and the other of frangible tabs 260 fractures along a region 270 of outer shell 44. The other frangible tab 260, not shown in FIG. 16, fractures in a similar manner. The fracturing of frangible tabs 260 as a result of impact force 252, prevents other components of closure assembly 20 from being damaged by impact force 252 allowing the sealing and venting functions of closure assembly to continue after impact force 252.

In preferred embodiments, arcuate groove 258 formed in outer shell 44 has a V-shaped cross section and has varying depth along its arc length as shown in FIGS. 18–20. For example, along line 18—18 of outer shell 44, arcuate groove has a first depth 262 as shown in FIG. 16. Along line 19—19 of outer shell 44, arcuate groove 258 has a second depth 264 which is less than first depth 262 as shown in FIG. 19. In addition, along line 18—18 of outer shell 44, arcuate groove has a third depth 266 which is less than second depth 264 as shown in FIG. 20. By varying the depth of arcuate groove 258 along its arc length, the portions of outer shell 44 that are closest axially to pressure-relief valve plate 98 are weakened to break more easily than those portions of outer shell 44 that are further away axially from pressure-relief valve plate 98.

Figure 23:
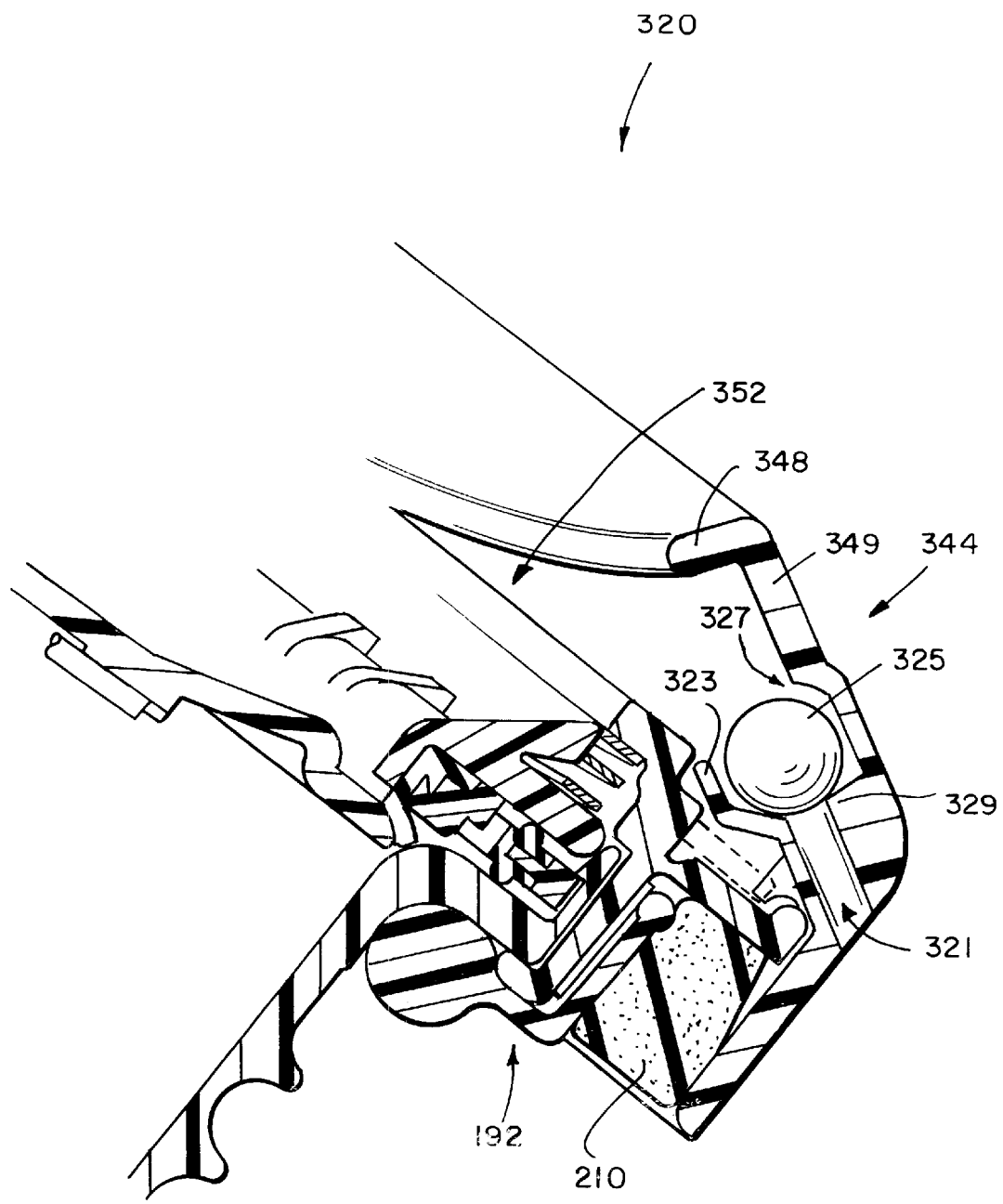
FIG. 23 is an enlarged sectional view of a first alternative embodiment closure assembly showing an outer shell of the closure assembly formed to include a fluid drain, a ball valve that normally closes the fluid drain, and ball trap structure appended to the outer shell and configured to prevent the ball from moving in axial, radial, and circumferential directions away from the drain beyond a float clearance distance.

A portion of an alternative embodiment closure assembly 320 is shown in FIG. 23. Closure assembly 320 is substantially similar to closure assembly 20 except that an outer shell 344 of closure assembly 320 is formed to include a fluid drain 321 and ball-trap structure or retainer 323 adjacent to fluid drain 321. Outer shell 344 is formed to include a float or ball recess 327 in a boot-engaging wall 349 thereof In addition, closure assembly 320 includes a ball valve 325 that is constrained by ball-trap structure 323 from moving in axial, radial, and circumferential directions away from fluid drain 321 beyond a float clearance distance. In a preferred embodiment, ball valve 325 is a substantially spherical member made out of a plastics material having a specific gravity of approximately 0.7 to 0.8.

Outer shell 344 includes a funnel-shaped valve seat shoulder 329 that surrounds fluid drain 321. Ball valve 325 is normally biased by gravity against valve seat shoulder 329 as shown in FIG. 23. When any liquid, such as rain water or water from a car wash, inadvertently moves through a nozzle-receiving opening 352 formed in a front wall 348 of closure assembly 320 it will pool or accumulate in an accumulation area adjacent to valve seat shoulder 329 and ball valve 325. The accumulation of liquid in the accumulation area causes ball valve 325 to float by a slight amount away from valve seat shoulder 329 so that the accumulated liquid drains through fluid drain 321 away from outer shell 344.

Closure assembly 320 includes a torque-override mechanism that is substantially similar to the torque-override mechanism of closure assembly 20. The torque-override mechanism of closure assembly 320 permits outer shell 344 to be rotated to a preferred orientation as was the case with closure assembly 20. When outer shell 344 is in the preferred orientation, fluid drain 321 is at the position shown in FIG. 21 in which the opening of fluid drain 321 is at substantially the lowest point possible so as to ensure that accumulated liquid drains therethrough.

When pump nozzle 224, which carries vapor recovery boot 226, is used with closure assembly 320, boot 226 seats against outer shell 344 and the positive pressure created by the displaced fuel vapor causes ball valve 325 to seat tightly against valve seat shoulder 329 to prevent fuel vapor loss during refueling. When using some types of vapor pump assisted nozzles with boots similar to nozzle 224 and boot 226, the negative pressure created by the vapor pump assisted nozzle is reduced by ball valve 325 lifting away from fluid drain 321 which allows ambient air to vent upwardly through fluid drain 321. The venting of ambient air through fluid drain 321 in this manner prevents vacuum induced premature nozzle shut-offs, particularly with vehicles equipped with liquid seal ORVR (On-Board Refueling Vapor Recovery) systems.

Figure 24:
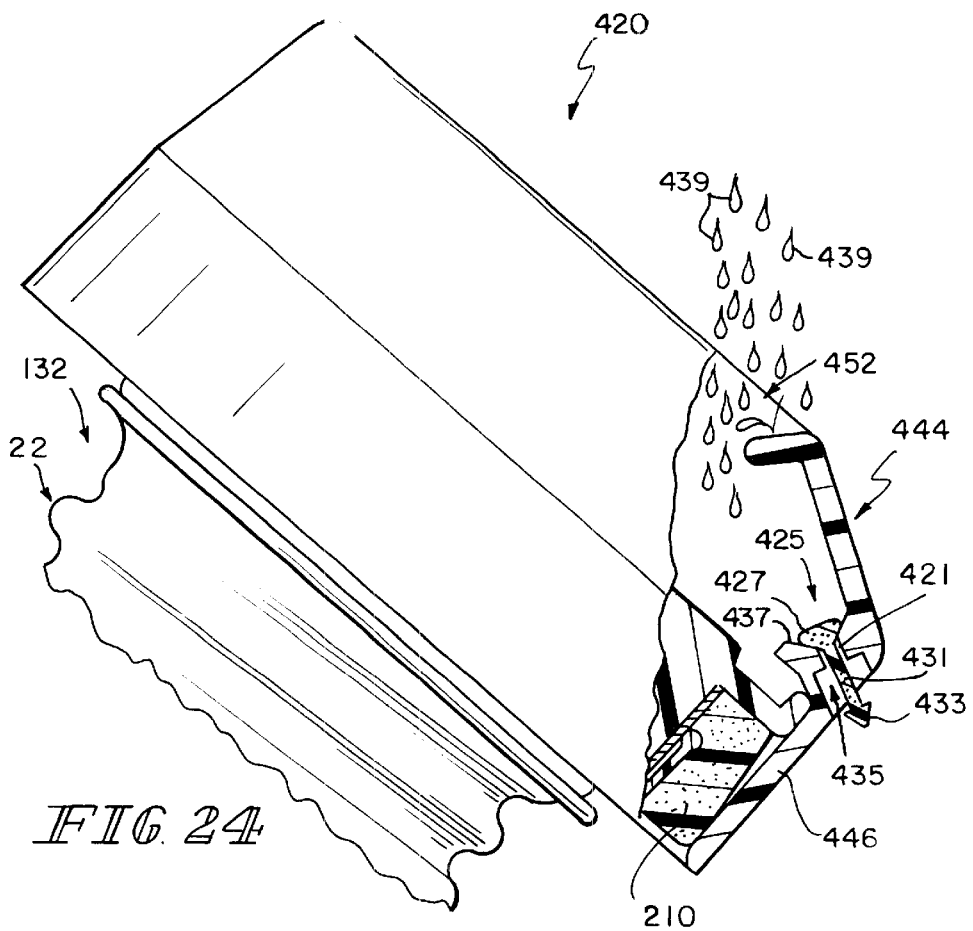
FIG. 24 is a side elevation view of a second alternative embodiment closure assembly, with portions broken away, showing an outer shell of the closure assembly formed to include a fluid drain and showing a drain valve trapped in the fluid drain and gravity-biased to a position closing the fluid drain.
Figure 25:
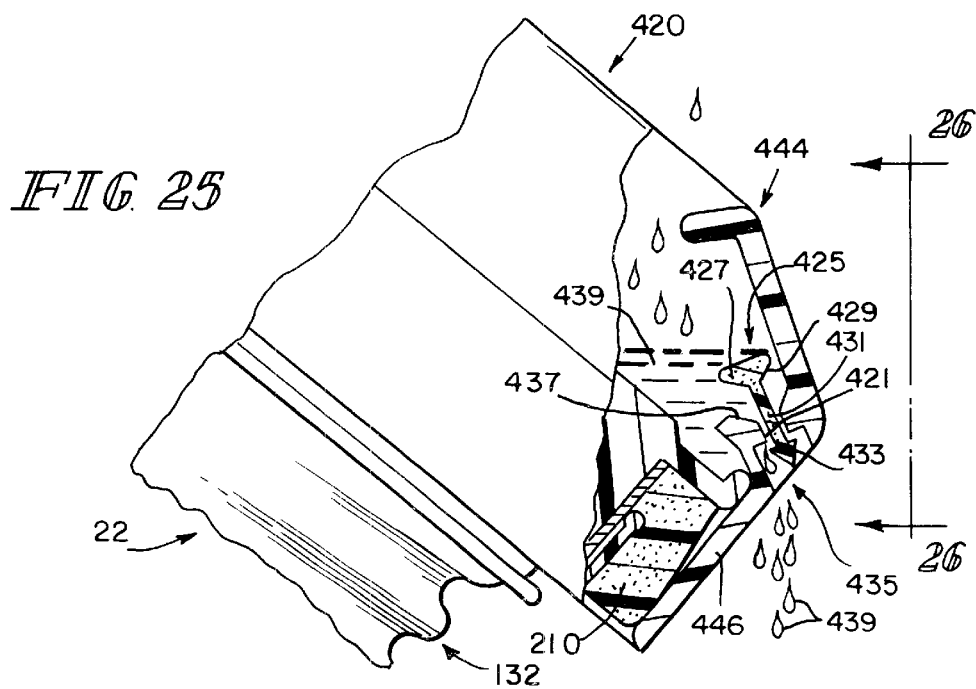
FIG. 25 is a view similar to FIG. 24 showing fluid pooling in the outer shell adjacent to the fluid drain, the drain valve floating upwardly due to the pooling fluid to open the fluid drain, and fluid draining through the fluid drain away from the outer shell.
Figure 26:
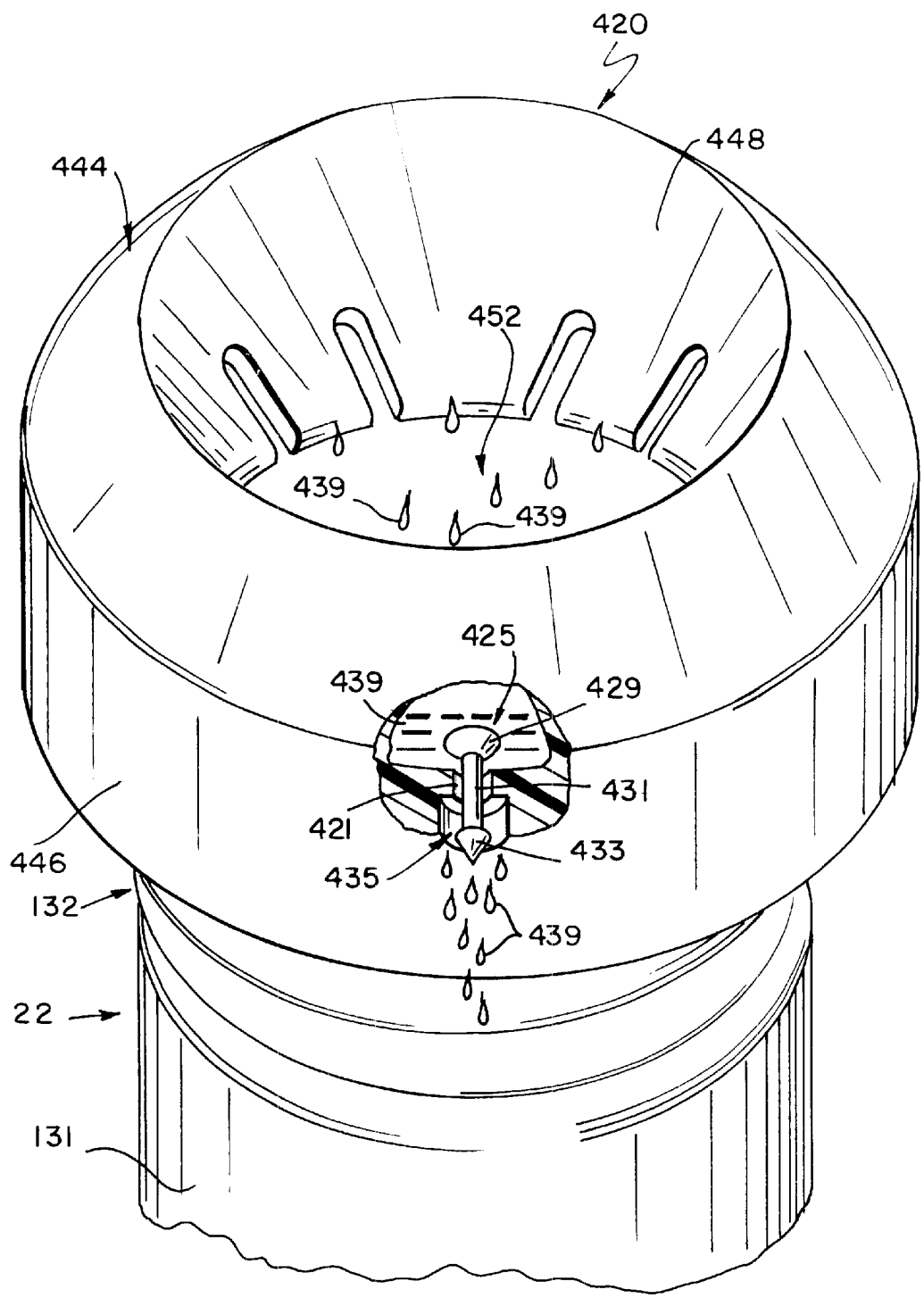
FIG. 26 is an isometric view taken along line 26—26 of FIG. 25, with portions broken away, to show the fluid drain and drain valve.

Another alternative embodiment closure assembly 420 is shown in FIGS. 24–26. Closure assembly 420 is substantially similar to closure assembly 20 except that an outer shell 444 of closure assembly 420 is formed to include a fluid drain 421. In addition, closure assembly 420 includes a float or valve 425. Float 425 includes an enlarged upper portion 427 having a seating surface 429, a stem 431 extending downwardly from portion 427 through fluid drain 421, and a retaining portion 433 appended to the bottom of stem 431.

Retaining portion 433 is configured to be pressed through fluid drain 421 during assembly of closure assembly 420. Retaining portion 433 resiliently deflects when pressed through drain 421 and expands upon exiting fluid drain 421 so that, after retaining portion 433 is pressed through drain 421, float 425 is constrained by stem 431 and retaining portion 433 from moving in axial, radial, and circumferential directions away from fluid drain 421 beyond a float clearance distance. Outer shell 444 is formed to include a recess 435 in a cylindrical side wall 446 thereof. Recess 435 is positioned to lie beneath fluid drain 421 in fluid communication therewith. In a preferred embodiment, float 425 is made out of a plastics material having a specific gravity of approximately 0.7 to 0.8.

Outer shell 444 includes a funnel-shaped valve seat shoulder 437 that surrounds fluid drain 321. Float 425 is normally biased by gravity against valve seat shoulder 437 as shown in FIG. 24. When any liquid 439, such as rain water or water from a car wash, inadvertently moves through a nozzle-receiving opening 452 formed in a front wall 448 of closure assembly 420 it will pool or accumulate in an accumulation region adjacent to valve seat shoulder 437 and float 425 as shown in FIGS. 25 and 26. The accumulation of liquid 439 in the accumulation area causes float 425 to move upwardly by a slight amount away from valve seat shoulder 437, thereby allowing liquid 439 to drain through fluid drain 421 and recess 435 away from outer shell 444.

Closure assembly 420 includes a torque-override mechanism that is substantially similar to the torque-override mechanism of closure assembly 20. The torque-override mechanism of closure assembly 420 permits outer shell 444 to be rotated to a preferred orientation as was the case with closure assembly 20. When outer shell 444 is in the preferred orientation, fluid drain 421 is at the position shown in FIGS. 24–26 in which the opening of fluid drain 421 is at substantially the lowest point possible so as to ensure that accumulated liquid 439 drains therethrough. Closure assembly 420 also includes foam ring 210 that absorbs some of the accumulated liquid 439. The absorbed liquid 439 eventually evaporates from foam ring 210.

When pump nozzle 224, which carries external fuel vapor recovery boot 226, is used in with closure assembly 420, boot 226 against outer shell 444 and the positive pressure created by the vapor recovery nozzle causes seating surface 429 of enlarged upper portion 427 of float 425 to seat tightly against valve seat shoulder 329 to prevent vapor loss during refueling. When using some types of vapor pump assisted nozzles with boots similar to nozzle 224 and boot 226, the negative pressure created by the vapor pump assisted nozzle is reduced by float 425 lifting away from fluid drain 421 which allows ambient air to vent upwardly through recess 435 and fluid drain 421. The venting of ambient air through fluid drain 421 in this manner prevents vacuum induced premature nozzle shut-offs particularly with vehicles equipped with liquid seal ORVR systems.

Although the invention has been described in detail with reference to certain preferred embodiments, variations and modifications exist within the scope and spirit of the invention as described and defined in the following claims.

What is claimed is:

1. A filler neck closure assembly for a vehicle fuel tank filler neck, the closure assembly comprising
 a housing formed to include a nozzle-receiving passage and adapted to couple to the filler neck, the housing including a cylindrical side wall,
 a tank pressure control assembly coupled to the housing, at least a portion of the tank pressure control assembly being surrounded by the cylindrical side wall, the tank pressure control assembly normally closing the nozzle-receiving passage and being operable to open the nozzle-receiving passage,
 an outer shell having an outer wall surrounding at least a portion of the cylindrical side wall of the housing and a nozzle-guiding surface extending from the outer wall and defining a central opening in fluid communication with the nozzle-receiving passage, and
 a sleeve surrounding the cylindrical side wall to reinforce the cylindrical side wall and to shield the portion of the tank pressure control assembly surrounded by the cylindrical side wall, the sleeve being positioned to lie between the outer shell and the housing and at least a portion of the sleeve being positioned to lie between the outer wall and nozzle-guiding surface of the outer shell.

2. The closure assembly of claim 1, further comprising a seal coupled to the housing and at least a portion of the sleeve being positioned to lie between the seal and the cylindrical side wall.

3. The closure assembly of claim 2, wherein at least a portion of the seal abuts the sleeve.

4. The closure assembly of claim 1, further comprising a ring of absorbent material and at least a portion of the sleeve being positioned to lie between the ring of absorbent material and the cylindrical side wall.

5. The closure assembly of claim 4, wherein at least a portion of the ring of absorbent material abuts the sleeve.

6. The closure assembly of claim 1, wherein the nozzle-guiding surface is formed to include at least one frangible member that breaks in response to engagement with the tank pressure control assembly during application of an impact force to the outer shell causing the outer shell to move axially relative to the tank pressure control assembly.

7. The closure assembly of claim 1, further comprising a torque-override mechanism and at least a portion of the sleeve being positioned to lie between the torque-override mechanism and the cylindrical side wall.

8. The closure assembly of claim 1, wherein the sleeve includes a hoop and a tab appended to the hoop, a first portion of the tab is positioned to lie adjacent to the cylindrical side wall, and a second portion of the tab is spaced from the cylindrical side wall.

9. The closure assembly of claim 8, wherein the housing further includes an annular flange appended to the housing, the annular flange is formed to include a slot, the first portion of the tab is positioned to lie in the slot, and the second portion of the tab is positioned to lie outside the slot.

10. The closure assembly of claim 8, wherein the second portion is angled relative to the first portion to secure the hoop axially relative to the cylindrical side wall.

11. The closure assembly of claim 8, wherein the housing includes an axially outwardly facing surface and an axially inwardly facing surface, the second portion of the tab engages the axially outwardly facing surface to prevent the hoop from moving in a first axial direction relative to the housing, and the sleeve includes an edge engaging the axially inwardly facing surface to prevent the hoop from moving in a second axial direction relative to the housing.

12. The closure assembly of claim 8, wherein the outer shell is coupled to the housing for rotation and further comprising a torque-override mechanism including a resilient finger appended to the housing, the torque-override mechanism further including a tooth appended to the outer shell and engaging the resilient finger to provide a torque override connection between the outer shell and the housing, and the first portion of the tab being positioned to lie between the resilient finger and the cylindrical side wall.

13. The closure assembly of claim 1, wherein the housing includes an annular flange formed to include a plurality of circumferentially spaced slots, the sleeve includes a hoop and a plurality of tabs appended to the hoop, and the tabs each include a first portion positioned to lie in a respective one of the plurality of slots.

14. The closure assembly of claim 13, wherein each of the tabs includes a second portion angled relative to the respective first portion to prevent the hoop from moving in a first axial direction relative to the housing, and the sleeve includes an edge engaging the housing to prevent the hoop from moving in a second axial direction relative to the housing.

15. The closure assembly of claim 14, wherein the annular flange includes a frangible portion configured to provide a fracture-initiation site during application of the impact force to the annular flange and the edge of the sleeve engages the frangible portion of the annular flange.

16. The closure assembly of claim 1, wherein the housing is made of a plastics material and the sleeve is made of a metal material.

17. A filler neck closure assembly for a vehicle fuel tank filler neck the closure assembly comprising
a housing formed to include a nozzle-receiving passage, the housing including an inner body adapted to couple to the filler neck and an outer body coupled to the inner body to define a vapor flow path between the inner and outer bodies,
a tank pressure control assembly coupled to the housing, the tank pressure control assembly normally closing the nozzle-receiving passage and being operable to open the nozzle-receiving passage, and
a seal coupled to the housing, the seal including an annular portion adapted to form a seal between the inner body and the filler neck and a sleeve portion appended to the annular portion and arranged to surround at least a portion of the inner body and at least a portion of the outer body to seal the vapor flow path between the inner and outer bodies.

18. The closure assembly of claim 17, wherein the seal has an L-shaped cross-section defined by the annular portion and the sleeve portion.

19. The closure assembly of claim 17, further comprising a ring of absorbent material and the sleeve portion including a cylindrical wall portion positioned to lie between the ring of absorbent material and the cylindrical side wall.

20. The closure assembly of claim 19, wherein the ring of absorbent material abuts the cylindrical wall portion of the sleeve portion.

21. The closure assembly of claim 17, further comprising an outer shell having a cylindrical wall surrounding the cylindrical side wall of the housing and the sleeve portion including a cylindrical wall portion positioned to lie between the cylindrical wall of the outer shell and the cylindrical side wall of the housing.

22. The closure assembly of claim 17, wherein the sleeve portion includes a cylindrical wall portion and a connector portion interconnecting the cylindrical wall portion and the annular portion.

23. The closure assembly of claim 22, wherein the connector portion extends radially outwardly from the annular portion and the cylindrical wall portion extends axially from the connector portion.

24. The closure assembly of claim 23, wherein the cylindrical wall portion includes an outer edge spaced apart from the connector portion and the outer edge is formed to include a bead that encompasses the outer body.

25. The closure assembly of claim 22, wherein the inner body includes a cylindrical wall and an annular lip appended to the cylindrical wall and extending radially outwardly therefrom, the annular portion abuts the cylindrical wall and the annular lip, the connector portion extends radially from the annular portion beyond the annular lip, and the cylindrical wall portion encompasses the annular lip.

26. The closure assembly of claim 25, wherein the outer body includes a cylindrical side wall positioned to lie between the annular lip and the cylindrical wall portion.

27. The closure assembly of claim 17, wherein the outer body includes a cylindrical side wall having a set of tab-receiving recesses formed therein, the inner body includes a cylindrical wall and a set of tabs appended to the cylindrical wall, the tabs are received in respective tab-receiving recesses, and the sleeve portion of the seal encompasses the tabs and the tab-receiving recesses.

28. The closure assembly of claim 17, wherein the inner body includes a cylindrical wall and an annular lip appended to the cylindrical wall and extending radially outwardly therefrom, the outer body includes a cylindrical side wall and a set of snap ledges appended to the cylindrical side wall, the snap ledges engage the annular lip, and the sleeve portion encompasses the annular lip and the snap ledges.

29. A filler neck closure assembly for a vehicle fuel tank filler neck, the closure assembly comprising
- a housing formed to include a nozzle-receiving passage and adapted to couple to the filler neck, the housing including a first cylindrical side wall,
- a tank pressure control assembly coupled to the housing, at least a portion of the tank pressure control assembly being surrounded by the first cylindrical side wall, the tank pressure control assembly normally closing the nozzle-receiving passage and being operable to open the nozzle-receiving passage,
- an outer shell coupled to the housing, the outer shell including a second side wall surrounding the first cylindrical wall side wall so that an annular space is defined between the first cylindrical side wall and the second side wall, and
- a ring of absorbent material positioned to lie in the annular space between the first cylindrical side wall and the second side wall, the absorbent material being configured to absorb axial and radial impacts applied to the outer shell.

30. The closure assembly of claim 29, wherein the ring of absorbent material is wedged between the first cylindrical side wall and the second side wall.

31. The closure assembly of claim 29, further comprising a torque-override mechanism positioned to lie axially outwardly of the annular space and the ring of absorbent material is positioned to lie axially inwardly of the torque-override mechanism.

32. The closure assembly of claim 31, wherein the outer shell includes a front wall appended to the second side wall and the torque-override mechanism is positioned to lie axially between the front wall and the ring of absorbent material.

33. The closure assembly of claim 29, wherein the ring of absorbent material is made of a hydrophillic material.

34. The closure assembly of claim 29, wherein the ring of absorbent material fills substantially all of the annular space.

35. The closure assembly of claim 29, wherein the housing includes an annular flange and the ring of absorbent material abuts the annular flange and abuts the second side wall.

36. The closure assembly of claim 29, wherein the second side wall is cylindrical.

37. A filler neck closure assembly for a vehicle fuel tank filler neck, the closure assembly comprising
- a housing formed to include a nozzle-receiving passage and adapted to couple to the filler neck, the housing including a first cylindrical side wall,
- a tank pressure control assembly coupled to the housing at least a portion of the tank pressure control assembly being surrounded by the first cylindrical side wall, the tank pressure control assembly normally closing the nozzle-receiving passage and being operable to open the nozzle-receiving passage,
- an outer shell coupled to the housing the outer shell including a second cylindrical side wall surrounding the first cylindrical wall side wall so that an annular space is defined between the first and second cylindrical side walls,
- a ring of absorbent material positioned to lie in the annular space between the first and second cylindrical side walls, the absorbent material being configured to absorb axial and radial impacts applied to the outer shell, and
- a seal including a sleeve portion between the first cylindrical side wall and the ring of absorbent material.

38. A filler neck closure assembly for a vehicle fuel tank filler neck, the closure assembly comprising
- a housing formed to include a nozzle-receiving passage and adapted to couple to the filler neck, the housing including a first cylindrical side wall,
- a tank pressure control assembly coupled to the housing, at least a portion of the tank pressure control assembly being surrounded by the first cylindrical side wall, the tank pressure control assembly normally closing the nozzle-receiving passage and being operable to open the nozzle-receiving passage,
- an outer shell coupled to the housing, the outer shell including a second cylindrical side wall surrounding the first cylindrical wall side wall so that an annular space is defined between the first and second cylindrical side walls,
- a ring of absorbent material positioned to lie in the annular space between the first and second cylindrical side walls, the absorbent material being configured to absorb axial and radial impacts applied to the outer shell, and
- a sleeve surrounding the first cylindrical wall to reinforce the first cylindrical wall and a portion of the ring of absorbent material abutting a portion of the sleeve.

39. A filler neck closure assembly for a vehicle fuel tank filler neck, the closure assembly comprising
- a housing formed to include a nozzle-receiving passage and adapted to couple to the filler neck, the housing including a first cylindrical side wall,
- a tank pressure control assembly coupled to the housing at least a portion of the tank pressure control assembly being surrounded by the first cylindrical side wall, the tank pressure control assembly normally closing the nozzle-receiving passage and being operable to open the nozzle-receiving passage,
- an outer shell coupled to the housing, the outer shell including a second cylindrical side wall surrounding the first cylindrical wall side wall so that an annular space is defined between the first and second cylindrical side walls,
- a ring of absorbent material positioned to lie in the annular space between the first and second cylindrical side walls the absorbent material being configured to absorb axial and radial impacts applied to the outer shell, and
- a seal having a cylindrical portion surrounding the first cylindrical wall and a portion of the ring of absorbent material abutting a portion of the cylindrical portion of the seal.

40. A filler neck closure assembly for a vehicle fuel tank filler neck, the closure assembly comprising
- a housing formed to include a nozzle-receiving passage and including a first portion adapted to couple to the filler neck, the first portion being made of a conductive grounding material,
- a plate supported by the housing and formed to include a nozzle-receiving opening, the plate being adapted so that a fuel-dispensing pump nozzle is insertable through the nozzle-receiving opening into the nozzle-receiving passage,
- a door coupled to the plate and movable between a first position closing the nozzle-receiving opening and a second position opening the nozzle-receiving opening, the door being made of a conductive grounding material, and an electrical coupler contacting the door and contacting the first portion to provide a grounding path for static electricity associated with the pump nozzle when contact is made between the pump nozzle and the door during insertion of the pump nozzle through the nozzle-receiving opening.

41. The closure assembly of claim 40, wherein the electrical coupler is a spring configured to bias the door toward the first position.

42. The closure assembly of claim 40, wherein the door is directly coupled to the plate.

43. The closure assembly of claim 40, wherein the door is spaced apart from the housing when the door is in the first position closing the nozzle-receiving opening.

44. The closure assembly of claim 40, wherein the door is made of a non-metallic conductive grounding material.

45. The closure assembly of claim 40, wherein the first portion is made of a non-metallic conductive grounding material.

46. The closure assembly of claim 40, wherein the door and the first portion are made of conductive acetal containing a carbon filler.

47. The closure assembly of claim 40, wherein the housing defines an axis, and the electrical coupler extends axially inwardly from the door to the first portion when the door is positioned in its first position.

48. A filler neck closure assembly for a vehicle fuel tank filler neck, the closure assembly comprising
- a housing formed to include a nozzle-receiving passage and adapted to be coupled to the filler neck,
- a tank pressure control assembly coupled to the housing, the tank pressure control assembly normally closing the nozzle-receiving passage and being operable to open the nozzle-receiving passage,
- an outer shell coupled to the housing and formed to include a nozzle-receiving opening, the outer shell including an accumulation area in which liquid accumulates, the outer shell being formed to include a drain communicating with the accumulation area, and
- a float retained in the accumulation area, the float being movable between a first position closing the drain and a second position opening the drain so that liquid flows from the accumulation area through the drain and out of the filler neck closure assembly.

49. The closure assembly of claim 48, wherein the accumulation area is positioned to lie outside the nozzle-receiving passage.

50. The closure assembly of claim 48, wherein the float has a specific gravity between about 0.7 and about 0.8.

51. The closure assembly of claim 48, wherein the outer shell includes a substantially funnel-shaped shoulder adjacent to the drain and the float seats against the shoulder when in the first position.

52. The closure assembly of claim 48, wherein the float is a spherical ball.

53. The closure assembly of claim 52, further comprising a retainer coupled to the outer shell adjacent to the drain and the retainer being configured to retain the spherical ball adjacent to the drain.

54. The closure assembly of claim 48, wherein the float includes an upper portion above the drain, a stem extending from the upper portion through the drain, and a retaining portion appended to the stem beneath the drain, and the upper portion and the retaining portion are configured to retain the float adjacent to the drain.

55. The closure assembly of claim 54, wherein the outer shell further includes a recess beneath the drain in fluid communication therewith and the retaining portion is constrained to move within the recess as the float moves between the first and second positions.

56. A filler neck closure assembly for a vehicle fuel tank filler neck, the closure assembly comprising
- a housing formed to include a nozzle-receiving passage and adapted to couple to the filler neck,
- a plate supported by the housing and formed to include a nozzle-receiving opening, the plate being adapted so that a fuel-dispensing pump nozzle is insertable through the nozzle-receiving opening into the nozzle-receiving passage,
- a door coupled to the plate and pivotable about an axis between a first position closing the nozzle-receiving opening and a second position opening the nozzle-receiving opening, and
- a standoff rib appended to the door, the standoff rib being positioned to engage the housing to limit the amount by which the door pivots during insertion of the fuel-dispensing pump nozzle through the nozzle-receiving opening upon movement of the door to the second position and to disengage the housing upon movement of the door away from the second position toward the first position.

57. The closure assembly of claim 49, further comprising a seal coupled to the plate adjacent to the nozzle-receiving opening, the door including a disk hang a sealing surface and a bump appended to the disk, the sealing surface engaging the seal to close the nozzle-receiving opening when the door is in the first position, the sealing surface being spaced apart from the seal when the door is in the second position, the bump including a first surface adapted to engage the fuel-dispensing pump nozzle to maintain the sealing surface in spaced-apart relation with the fuel-dispensing pump nozzle during insertion of the fuel-dispensing pump nozzle through the nozzle-receiving opening, the bump including a second surface, and the standoff rib being appended to the second surface.

58. The closure assembly of claim 57, further comprising a support web appended to the standoff rib and appended to the second surface of the bump, the support web rigidifying the bump and rigidifying the standoff rib.

59. The closure assembly of claim 58, wherein the door is coupled to the plate at a location through which the axis passes, and the standoff rib is positioned between the location and the support web.

60. The closure assembly of claim 57, wherein the disk has a first thickness and the bump has a second thickness between the first and second surfaces, and the second thickness is substantially equivalent to the first thickness.

61. The closure assembly of claim 57, wherein the standoff rib is angled with respect to the second surface and the standoff rib is substantially perpendicular to the disk.

62. The closure assembly of claim 56, further comprising a spring extending between the door and the housing to normally bias the door in the first position.

63. The closure assembly of claim 62, wherein the standoff rib is positioned in spaced-apart relation to the spring and extends away from the spring.

64. The closure assembly of claim 56, wherein the filler neck defines another nozzle-receiving opening having a diameter smaller than a diameter of the nozzle-receiving opening, and the standoff rib orients the door so that the door is adapted to guide the fuel-dispensing pump nozzle through the another nozzle-receiving opening when the standoff rib engages the housing.

65. The closure assembly of claim 56, in combination with a vehicle fuel tank filler neck, wherein the filler neck includes a portion coupled to the housing and defining another nozzle-receiving opening having a diameter smaller than a diameter of the nozzle-receiving opening, and the standoff rib orients the door so that the door is adapted to guide the fuel-dispensing pump nozzle through the another nozzle-receiving opening when the standoff rib engages the housing.

66. The closure assembly of claim 56, wherein the door includes a bump adapted to contact the fuel-dispensing pump nozzle during insertion thereof through the nozzle-receiving opening, and the standoff rib is coupled to the bump.

67. The closure assembly of claim 66, wherein the bump includes a first surface and a second surface facing away from the first surface, the first surface is adapted to contact the fuel-dispensing pump nozzle during insertion thereof through the nozzle-receiving opening, the second surface defines a cavity, and the standoff rib is coupled to the second surface in the cavity.

68. A filler neck closure assembly for a vehicle fuel tank filer neck, the closure assembly comprising
- a housing formed to include a nozzle-receiving passage and adapted to be coupled to the filler neck,
- a tank pressure control assembly coupled to the housing, the tank pressure control assembly normally closing the nozzle-receiving passage and being operable to open the nozzle-receiving passage, and
- an outer shell coupled to the housing, the outer shell including a side wall and a font wall coupled to the side wall, the front wall being formed to include a nozzle-receiving opening in fluid communication with the nozzle-receiving passage, the front wall including at least one frangible member that breaks in response to engagement with the tank pressure control assembly during application of an impact force to the outer shell causing the outer shell to move axially relative to the tank pressure control assembly.

69. The closure assembly of claim 68, wherein the front wall is formed to include a groove adjacent to the at least one frangible member and the groove is sized to weaken the front wall of the outer shell.

70. The closure assembly of claim 69, wherein the at least one frangible member includes two frangible members separated by a slot and the groove is formed in the outer shell to lie adjacent to the slot and adjacent to the frangible members.

71. The closure assembly of claim 70, wherein the groove is formed with varying depth along its length.

72. The closure assembly of claim 69, wherein the groove has a V-shaped cross section.

73. The closure assembly of claim 68, wherein the housing includes a cylindrical wall defining an axis and the at least one frangible member is inclined with respect to the axis.

* * * * *